US012361624B2

(12) United States Patent
Shirai

(10) Patent No.: US 12,361,624 B2
(45) Date of Patent: Jul. 15, 2025

(54) INFORMATION PROCESSING SYSTEM, METHOD FOR PROCESSING INFORMATION, AND NON-TRANSITORY COMPUTER-READABLE STORAGE MEDIUM FOR CONTROLLING A FIRST AND OR SECOND AVATAR TO AUTOMATICALLY PERFORM A CERTAIN MOTION

(71) Applicant: GREE, Inc., Tokyo (JP)

(72) Inventor: Akihiko Shirai, Kanagawa (JP)

(73) Assignee: GREE HOLDINGS, Inc., Tokyo (JP)

( * ) Notice: Subject to any disclaimer, the term of this patent is extended or adjusted under 35 U.S.C. 154(b) by 237 days.

(21) Appl. No.: 18/216,604

(22) Filed: Jun. 30, 2023

(65) Prior Publication Data
US 2024/0046541 A1    Feb. 8, 2024

Related U.S. Application Data

(60) Provisional application No. 63/392,603, filed on Jul. 27, 2022.

(51) Int. Cl.
G06T 13/40    (2011.01)
G06T 11/60    (2006.01)
G06T 19/00    (2011.01)

(52) U.S. Cl.
CPC ............. *G06T 13/40* (2013.01); *G06T 11/60* (2013.01); *G06T 19/003* (2013.01)

(58) Field of Classification Search
CPC ....... G06T 13/40; G06T 11/60; G06T 19/003; A63F 13/79; A63F 13/58; A63F 13/35; A63F 13/87
See application file for complete search history.

(56) References Cited

U.S. PATENT DOCUMENTS

| | | | | |
|---|---|---|---|---|
| 2010/0083139 A1* | 4/2010 | Dawson | ............... | A63F 13/30 715/757 |
| 2011/0060744 A1* | 3/2011 | Brignull | ............... | G06Q 10/10 707/E17.108 |
| 2013/0275887 A1* | 10/2013 | DeLuca | ............... | G06Q 30/02 715/757 |
| 2024/0004456 A1* | 1/2024 | Todasco | ............... | G06F 3/011 |
| 2024/0062448 A1* | 2/2024 | Mourkogiannis | ....... | A63F 13/87 |

\* cited by examiner

*Primary Examiner* — Maurice L. McDowell, Jr.
(74) *Attorney, Agent, or Firm* — XSENSUS LLP

(57) ABSTRACT

An information processing system includes processing circuitry configured to process motion of each avatar of plural avatars in a virtual space; associate, with an avatar of the plural avatars, text information specified by a user corresponding to the avatar or text information relating to the avatar; determine a relationship between text information associated with a first avatar and text information associated with a second avatar; and in a case that the first avatar and the second avatar have a first positional relationship in the virtual space, control the second avatar or both the first avatar and the second avatar to automatically perform a certain motion based on a result of the determined relationship.

20 Claims, 15 Drawing Sheets

FIG. 8 tag[AVATAR C1] = [ 🎸 ,100], [ 🥁 ,50], [ 🎹 ,20]

tag[AVATAR C2] = [ 🎸 ,50], [ 🥁 ,100], [ 🎹 ,20]

tag[AVATAR C3] = [ 🍦 ,100], [ 🥁 ,50], [ 🎹 ,50]

tag[AVATAR C4] = [ ⚽ ,100], [ 📣 ,50], [ 💀 ,50]

tag[AVATAR C5] = [ ⚽ ,100], [ 🎮 ,50], [ 🎰 ,50]

FIG. 11

| AUTOMATIC REACTION ID | AUTOMATIC REACTION ATTRIBUTE | TRIGGER CONDITION INFORMATION | ANIMATION DATA | PLAYBACK INFORMATION |
|---|---|---|---|---|
| *** | *** | *** | *** | *** |
| ... | ... | ... | ... | ... |

FIG. 12

| USER ID | USER NAME | AVATAR ID | PROFILE INFORMATION | CONVERSATION/SPEECH INFORMATION | ACTIVITY INFORMATION | TEXT INFORMATION (TAG INFORMATION) | FRIEND INFORMATION | TASTE INFORMATION | LIMITING FLAG INFORMATION | ITEM INFORMATION | AUTOMATIC REACTION SETTING INFORMATION |
|---|---|---|---|---|---|---|---|---|---|---|---|
| *** | *** | *** | *** | *** | *** | *** | *** | *** | *** | *** | *** |
| *** | *** | *** | *** | *** | *** | *** | *** | *** | *** | *** | *** |
| ... | ... | ... | ... | ... | ... | ... | ... | ... | ... | ... | ... |

FIG. 13

USER PROFILE name * * *

ID * * *_* * * *

CALL ME * * ♡

I AM A * * * BORN ON * * * *, AND MY BLOOD TYPE IS * *.

MY PERSONALITY IS * * * *, AND MY HOBBY IS * * * *.

I LIKE EATING * * * ♡ MY FAVORITE SONG IS * * * *!

NOW I WANT * *, AND MY FONDEST MEMORY IS * * * * ♡

I ENJOY METAVERSE SPACE FOR (MEMORY)/WATCHING/BOTH.

I USUALLY STAY IN METAVERSE SPACE AROUND * *.

PLEASE MAKE FRIENDS WITH ME!

MY THREE FAVORITE EMOJIS

| AVATAR ID | FACE PART ID | HAIR PART ID | CLOTHES PART ID | ... |
|---|---|---|---|---|
| A01 | *** | *** | *** | ... |
| A02 | *** | *** | *** | ... |
| ... | ... | ... | ... | ... |

INFORMATION PROCESSING SYSTEM, METHOD FOR PROCESSING INFORMATION, AND NON-TRANSITORY COMPUTER-READABLE STORAGE MEDIUM FOR CONTROLLING A FIRST AND OR SECOND AVATAR TO AUTOMATICALLY PERFORM A CERTAIN MOTION

PRIORITY INFORMATION AND CROSS-REFERENCE TO RELATED APPLICATIONS

The present application claims priority to U.S. Provisional Application No. 63/392,603, filed on Jul. 27, 2022, the entire contents of which is incorporated by reference.

BACKGROUND

1. Technical Field

The present disclosure relates to an information processing system, a method for processing information, and a non-transitory computer-readable storage medium.

2. Description of the Related Art

A technique for generating, until a first trigger such as a conversation start trigger is detected, display control data for arranging a plurality of virtual characters in accordance with an arrangement obtained by a virtual character arrangement obtaining unit and then generating, in response to detection of the first trigger, display control data for changing the arrangement of the first virtual characters in a virtual space associated with the first trigger is known.

SUMMARY

In an exemplary implementation of the present disclosure, an information processing system comprises processing circuitry configured to process motion of each avatar of plural avatars in a virtual space; associate, with an avatar of the plural avatars, text information specified by a user corresponding to the avatar or text information relating to the avatar; determine a relationship between text information associated with a first avatar and text information associated with a second avatar; and in a case that the first avatar and the second avatar have a first positional relationship in the virtual space, control the second avatar or both the first avatar and the second avatar to automatically perform a certain motion based on a result of the determined relationship.

BRIEF DESCRIPTION OF THE DRAWINGS

FIG. 8 is a diagram illustrating inter-word distances based on tag information.

FIG. 11 is a diagram illustrating an example of data in an automatic reaction-related data storage unit.

FIG. 12 is a diagram illustrating an example of data in a user information storage unit.

FIG. 13 is a diagram illustrating profile information.

FIG. 14 is a diagram illustrating an example of data in an avatar information storage unit.

DETAILED DESCRIPTION

Figure 1:
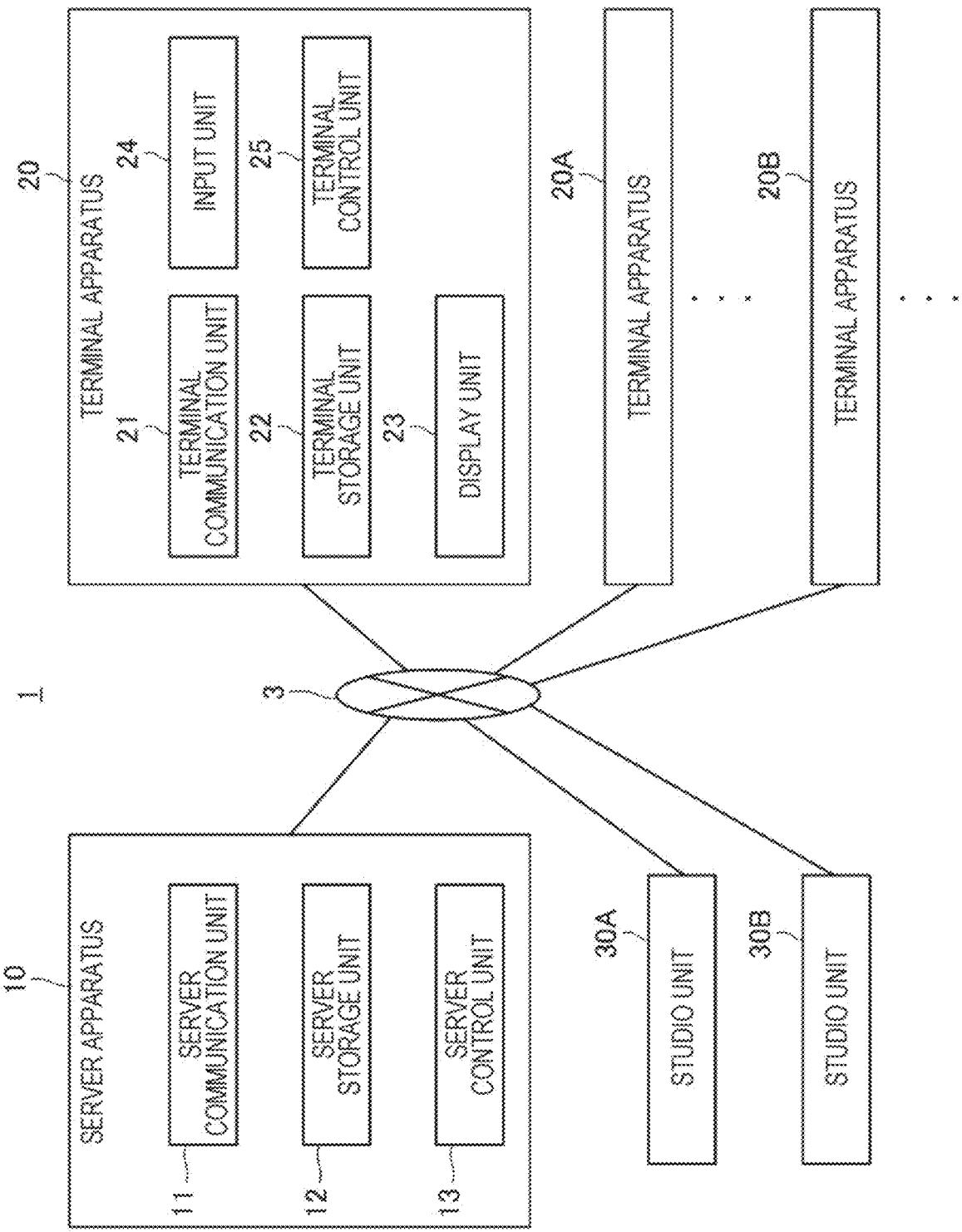
FIG. 1 is a block diagram of a virtual reality generation system according to an embodiment.

In the above example of the related art, it is difficult to effectively facilitate interaction between avatars.

An aspect of the present disclosure, therefore, aims to effectively facilitate interaction between avatars.

The aspect provides an information processing system including an avatar processing unit that processes a motion of each of avatars in a virtual space, an association unit that associates, with each avatar, text information specified by a corresponding user or text information relating to the avatar, and a first determination section that determines a relationship between the text information associated with a first avatar and the text information associated with a second avatar. In a case where the first avatar and the second avatar have a first certain positional relationship in the virtual space, the avatar processing unit causes the second avatar or both the first avatar and the second avatar to automatically perform a certain motion on a basis of a result of the determination.

Another aspect may provide a non-transitory computer-readable storage medium storing a computer-executable instruction causing, when executed by one or a plurality of processors of an information processing system, the one or plurality of processors to perform a process including processing a motion of each of avatars in a virtual space, associating, with each avatar, text information specified by a corresponding user or text information relating to the avatar, and determining a relationship between the text information associated with a first avatar and the text information associated with a second avatar. In a case where, in the processing, the first avatar and the second avatar have a certain positional relationship in the virtual space, the second avatar or both the first avatar and the second avatar are caused to automatically perform a certain motion on a basis of a result of the determining.

Another aspect may provide a method for processing information performed by a computer. The method includes processing a motion of each of avatars in a virtual space, associating, with each avatar, text information specified by a corresponding user or text information relating to the avatar, and determining a relationship between the text information associated with a first avatar and the text information associated with a second avatar. In a case where, in the processing, the first avatar and the second avatar have a certain positional relationship in the virtual space, the second avatar or both the first avatar and the second avatar are caused to automatically perform a certain motion on a basis of a result of the determining.

According to the above aspects, the present disclosure can efficiently facilitate interaction between avatars.

An embodiment will be described in detail hereinafter with reference to the accompanying drawings. Reference numerals might be given to only some of parts having the same attributes in the accompanying drawings for the sake of simplicity.

Figure 2:
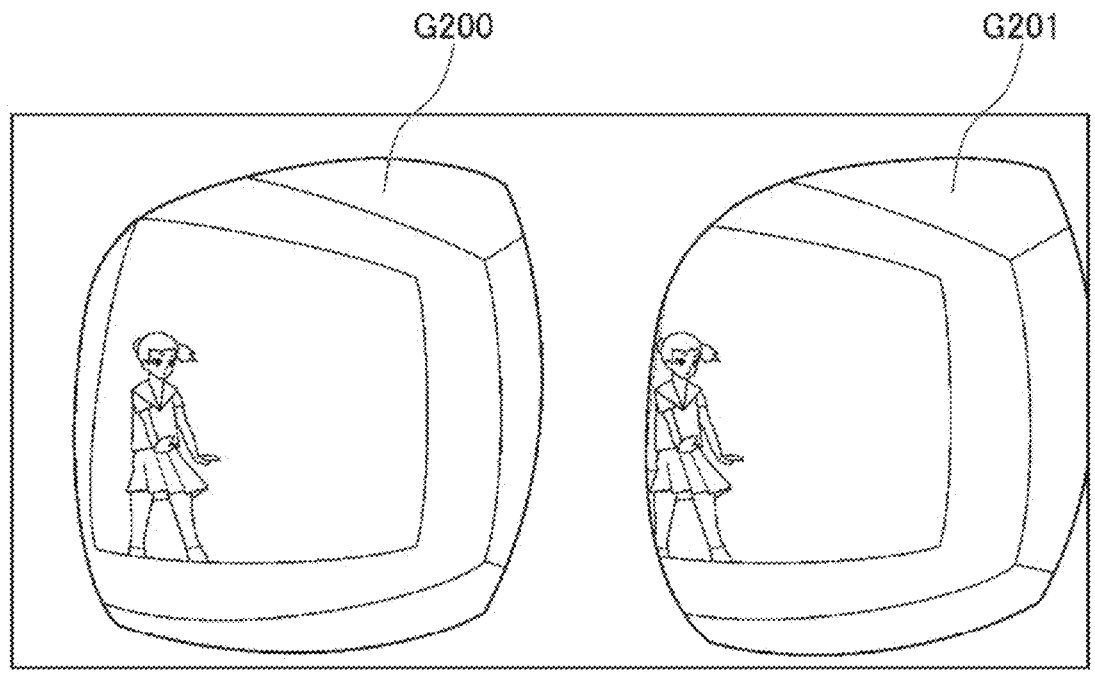
FIG. 2 is a diagram illustrating terminal images viewable through a head-mounted display.

An outline of a virtual reality generation system 1 according to the embodiment will be described with reference to FIG. 1. FIG. 1 is a block diagram of the virtual reality generation system 1 according to the present embodiment. FIG. 2 is a diagram illustrating terminal images viewable through a head-mounted display.

The virtual reality generation system 1 includes a server apparatus 10 and one or more terminal apparatuses 20. Although FIG. 1 illustrates three terminal apparatuses 20, 20A, and 20B for the sake of simplicity, the number of terminal apparatuses 20 may be two or more.

The server apparatus 10 is an information processing system, such as a server, managed by service providers who provide one or more types of virtual reality. The terminal apparatuses 20 are apparatuses used by users, such as mobile phones, smartphones, tablet terminals, personal computers (PCs), head-mounted displays, or video game consoles. The terminal apparatuses 20 can be typically connected to the server apparatus 10 over a network 3 in modes different between the users.

The terminal apparatuses 20 are capable of executing a virtual reality application according to the present embodiment. The terminal apparatuses 20 may receive the virtual reality application from the server apparatus 10 or a certain application distribution server over the network 3, or storage devices included in the terminal apparatuses 20 or storage media readable by the terminal apparatuses 20, such as memory cards, may store the virtual reality application in advance. The server apparatus 10 and the terminal apparatuses 20 are communicably connected to the network 3. For example, the server apparatus 10 and the terminal apparatuses 20 operate together to perform various types of processing relating to virtual reality.

The terminal apparatuses 20 are communicably connected to one another through the server apparatus 10. In the following description, "a terminal apparatus 20 transmits information to another terminal apparatus 20" means "a terminal apparatus 20 transmits information to another terminal apparatus 20 through the server apparatus 10". Similarly, "a terminal apparatus 20 receives information from another terminal apparatus 20" means "a terminal apparatus 20 receives information from another terminal apparatus 20". In a modification, however, the terminal apparatuses 20 may be communicably connected to one another without the server apparatus 10.

The network 3 may include a wireless communication network, the Internet, a virtual private network (VPN), a wide-area network (WAN), a wired network, or any selective combination of these.

In the example illustrated in FIG. 1, the virtual reality generation system 1 includes studio units 30A and 30B. As with the service providers' terminal apparatuses 20A, the studio units 30A and 30B are also used by the service providers. The studio units 30A and 30B can be provided in studios, rooms, halls, or the like for creating content. The studio units 30A and 30B may be provided with motion capture equipment.

The studio units 30 can have the same functions as the service providers' terminal apparatuses 20A and/or the server apparatus 10. When the service providers and participants are distinguished from each other in the following description, a mode where the service providers' terminal apparatuses 20A distribute various pieces of content to the participants' terminal apparatuses 20B through the server apparatus 10 will be mainly described in order to simplify the description. When the studio units 30A and 30B facing users who are the service providers have the same functions as the service providers' terminal apparatuses 20A, however, various pieces of content may be distributed to the participants' terminal apparatuses 20B through the server apparatus 10 instead of this or in addition to this. In a modification, the virtual reality generation system 1 need not include the studio units 30A and 30B.

Although the virtual reality generation system 1 achieves an example of the information processing system in the following description, the elements (refer to a terminal communication unit 21 to a terminal control unit 25 illustrated in FIG. 1) of a specific one of the terminal apparatuses 20 may achieve an example of the information processing system, or a plurality of terminal apparatuses 20 may together achieve an example of the information processing system, instead. Alternatively, the server apparatus 10 may independently achieve an example of the information processing system, or the server apparatus 10 and one or more of the terminal apparatuses 20 may together achieve an example of the information processing system.

An outline of virtual reality according to the present embodiment will be described hereinafter. The virtual reality according to the present embodiment is generated for any type of reality including education, trips, role playing, simulations, and entertainment such as video games or concerts, and virtual reality media such as avatars are used as the virtual reality is achieved. The virtual reality according to the present embodiment, for example, may be achieved by a three-dimensional virtual space, various virtual reality media that appear in the virtual space, and various contents provided in the virtual space.

The virtual reality media are electronic data used in the virtual reality and include, for example, cards, items, points, currencies in services (or currencies in the virtual reality), tokens (e.g., non-fungible tokens (NFTs)), tickets, characters, avatars, parameters, and any other medium. The virtual reality media may be virtual reality-related information such as level information, status information, parameter information (physical strength, attack power, etc.), or ability information (skills, abilities, magic, jobs, etc.), instead. The virtual reality media are electronic data that can be obtained, owned, used, managed, exchanged, combined, enhanced, sold, discarded, or donated by the users in the virtual reality, but use modes of the virtual reality media are not limited to those specified herein.

The avatars typically take a form of characters having front directions and may be humans, animals, or other existences. The avatars may have various appearances (appearances when drawn) when being associated with various avatar items. In the following description, the users and the avatars might be identified with each other due to characteristics of the avatars. "An avatar does something", therefore, might be synonymous with "a user does something".

The users may wear wearable devices on the head or part of the face and view the virtual space. The wearable devices may be head-mounted displays or glasses-shaped devices. The glasses-shaped devices may be so-called augmented reality (AR) glasses or mixed reality (MR) glasses. In any case, the wearable devices may be different from the terminal apparatuses 20 or achieve a subset or all of the functions of the terminal apparatuses 20. The terminal apparatuses 20 may be achieved by head-mounted displays.

Configuration of Server Apparatus

The configuration of the server apparatus 10 will be specifically described. The server apparatus 10 is achieved by a server computer. The server apparatus 10 may be achieved by a plurality of server computers that operate together, instead. For example, the server apparatus 10 may be achieved by a server computer that provides various contents, a server computer that achieves various authentication servers, and the like. The server apparatus 10 may include a webserver. In this case, a subset of functions of the terminal apparatuses 20, which will be described later, may be achieved by processing HyperText Markup Language (HTML) documents received from the webserver and various accompanying programs using a browser.

As illustrated in FIG. 1, the server apparatus 10 includes a server communication unit 11, a server storage unit 12, and a server control unit 13.

The server communication unit 11 communicates with external apparatuses wirelessly or by wire and includes an interface for communicating information. The server communication unit 11 may include, for example, a wireless local area network (LAN) communication module or a wired LAN communication module. The server communication unit 11 is capable of communicating information with the terminal apparatuses 20 over the network 3.

The server storage unit 12 is a storage device, for example, and stores various pieces of information and programs necessary to perform various types of processing relating to the virtual reality.

The server control unit 13 may include a dedicated microprocessor, a central processing unit (CPU) that achieves certain functions by reading a certain program, a graphics processing unit (GPU), or the like. For example, the server control unit 13 executes the virtual reality application in accordance with user inputs by operating together with the terminal apparatuses 20.

Configuration of Terminal Apparatuses

The configuration of the terminal apparatuses 20 will be described. As illustrated in FIG. 1, the terminal apparatuses 20 each include a terminal communication unit 21, a terminal storage unit 22, a display unit 23, an input unit 24, and a terminal control unit 25.

The terminal communication unit 21 communicates with external apparatuses wirelessly or by wire and includes an interface for communicating information. The terminal communication unit 21 may include, for example, a wireless communication module, a wireless LAN communication module, or a wired LAN communication module compliant with a mobile communication standard such as long-term evolution (LTE), LTE-Advanced (LTE-A), a fifth-generation mobile communication system, or ultra mobile broadband (UMB). The terminal communication unit 21 is capable of communicating information with the server apparatus 10 over the network 3.

The terminal storage unit 22 includes, for example, a primary storage device and a secondary storage device. The terminal storage unit 22 may include, for example, a semiconductor memory, a magnetic memory, or an optical memory. The terminal storage unit 22 stores various pieces of information and programs that are received from the server apparatus 10 and that are used for processing of the virtual reality. The information and the programs used for the processing of the virtual reality may be obtained from external apparatuses through the terminal communication unit 21. For example, a virtual reality application program may be obtained from a certain application distribution server. The application program will also be referred to simply as an "application" hereinafter.

The terminal storage unit 22 may store data for drawing virtual spaces, such as images of indoor spaces including the inside of buildings and outdoor spaces. A plurality of pieces of data may be prepared for each virtual space and used for different purposes.

The terminal storage unit 22 may store various images (texture images) to be projected (texture mapping) onto various objects provided in three-dimensional virtual spaces.

For example, the terminal storage unit 22 stores avatar drawing information relating to avatars as virtual reality media associated with the users. Avatars in virtual spaces are drawn on the basis of avatar drawing information relating to the avatars.

The terminal storage unit 22 also stores drawing information relating to various objects (virtual reality media) different from avatars, such as various gift objects, buildings, walls, and non-player characters (NPCs). Various objects in virtual spaces are drawn on the basis of such drawing information. The gift objects each correspond to a gift from one user to another and is a kind of item. The gift objects may include avatars' clothing (clothes and accessories), avatars' decorations (fireworks, flowers, etc.), backgrounds (wallpapers) and similar objects, and tickets that can be used to win "gacha" (lotteries) and similar objects. The term "gift" used herein refers to the same concept as "token". The techniques described in the present application, therefore, can be understood while replacing the term "gift" with the term "token".

The display unit 23 includes a display device such as a liquid crystal display or an organic electroluminescent (EL) display. The display unit 23 is capable of displaying various images. The display unit 23 is achieved by a touch panel, for example, and functions as an interface for detecting various user operations. The display unit 23 may be incorporated into a head-mounted display, instead.

The input unit 24 may include a physical key or may further include any input interface typified by a pointing device such as a mouse. The input unit 24 may be capable of receiving noncontact user inputs such as voice inputs, gesture inputs, and gaze inputs. For gesture inputs, sensors for detecting various states of the user (image sensors, acceleration sensors, distance sensors, etc.), a dedicated motion capture technique based on sensor technologies and cameras, controllers such as joypads, or the like may be employed. A camera for detecting a gaze may be provided inside a head-mounted display. The various states of the user are the user's orientation, position, or motion, for example, which is a concept including not only an orientation, a position, or a motion of the entirety of the user's body or part of the user's body, such as the face or the hands, but also an orientation, a position, or a motion of the user's gaze.

Figure 3:
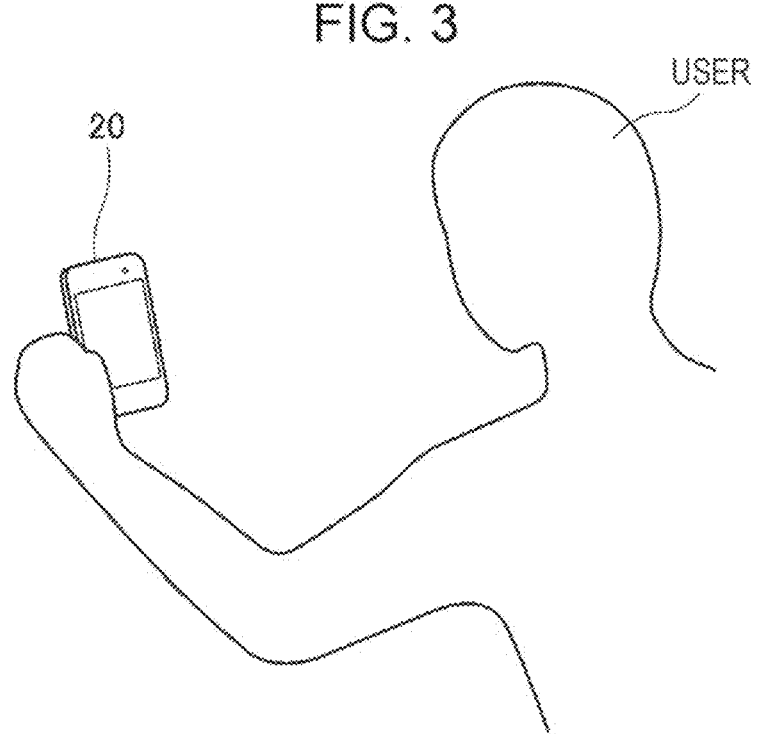
FIG. 3 is a diagram illustrating a terminal image viewable on a smartphone.

User inputs based on gestures may be used to change a perspective of a virtual camera. As schematically illustrated in FIG. 3, for example, when the user changes an orientation of the terminal apparatus 20 while holding the terminal apparatus 20 in his/her hand, the perspective of the virtual camera may be changed in accordance with the orientation.

In this case, even when a terminal apparatus 20 with a relatively small screen, such as a smartphone, is used, the same size of a visible area can be secured as when the user can look around through a head-mounted display.

The terminal control unit 25 includes one or more processors. The terminal control unit 25 controls overall operation of the terminal apparatus 20.

The terminal control unit 25 communicates information through the terminal communication unit 21. For example, the terminal control unit 25 receives various pieces of information and programs used for various types of processing relating to the virtual reality from at least the server apparatus 10 or another external server. The terminal control unit 25 stores the received information and programs in the terminal storage unit 22. For example, the terminal storage unit 22 may store a browser (Internet browser) for connecting to a webserver.

The terminal control unit 25 activates the virtual reality application in accordance with a user operation. The terminal control unit 25 performs various types of processing relating to the virtual reality by operating together with the server apparatus 10. For example, the terminal control unit 25 displays an image of a virtual space on the display unit 23. A graphic user interface (GUI) for detecting a user operation, for example, may be displayed on a screen. The terminal control unit 25 is capable of detecting user operations through the input unit 24. For example, the terminal control unit 25 is capable of detecting various operations (operations corresponding a tap, a long tap, a flick, a swipe, etc.) based on the user's gestures. The terminal control unit 25 transmits operation information to the server apparatus 10.

The terminal control unit 25 draws avatars and the like along with a virtual space (image) and displays terminal images on the display unit 23. As illustrated in FIG. 2, for example, images G200 and G201 viewed by the left and right eyes, respectively, may be generated to generate a stereoscopic image for a head-mounted display. FIG. 2 schematically illustrates the images G200 and G201 viewed by the left and right eyes, respectively. An image in a virtual space will refer to the entirety of an image achieved by the images G200 and G201 hereinafter unless otherwise noted. The terminal control unit 25 achieves various motions of avatars and the like in the virtual space in accordance with, for example, various operations performed by the user.

The functions achieved by the components (e.g., the server control unit 13, the terminal control unit 25, etc.) described herein may be implemented by a general-purpose processor, an application-specific processor, an integrated circuit, an application-specific integrated circuit (ASIC), a CPU, and/or a conventional circuit programmed to achieve the functions and/or circuitry or processing circuitry including a combination of these. The processor includes transistors and other circuits and is regarded as circuitry or processing circuitry. The processor may be a programmed processor that executes the programs stored in the memory, instead.

Circuitry, units, and means herein are hardware that is programmed to achieve the functions or that executes the functions. The hardware may be any type of hardware disclosed herein or any type of hardware that is programmed to execute the functions or that is known to execute the functions.

When the hardware is a processor regarded as of a circuitry type, the circuitry, the means, or the unit is a combination of the hardware and software used to achieve the hardware and/or the processor.

A virtual space that will be described hereinafter is a concept including not only an immersive space visually recognizable using a head-mounted display or the like and a continuous three-dimensional space where a user can freely move (as in reality) as an avatar but also a non-immersive space visually recognizable using a smartphone or the like, such as that described above with reference to FIG. 3. A non-immersive space visually recognizable using a smartphone or the like may be a continuous three-dimensional space where a user can freely move as an avatar or a discontinuous two-dimensional space. Continuously three-dimensional spaces where a user can freely move as an avatar (e.g., a 3D avatar) and other virtual spaces (e.g., a discontinuous space) will be referred to as "metaverse spaces" and "non-metaverse spaces", respectively, when distinguished from each other.

A wide variety of users can exist in such various virtual spaces. Streaming users, for example, refer to users who transmit information regarding videos and/or sounds. Streaming users, for example, may be users who organize or hold independent video streaming, collaborated streaming where a plurality of persons can participate, a video chat or a voice chat where a plurality of persons can participate and/or view, or an event (a party etc.) in a virtual space where a plurality of persons can participate and/or view, that is, users who host such events. Streaming users in the present disclosure, therefore, can also be referred to as host users, organizing users, or holding users.

Viewing users, on the other hand, refer to users who receive information regarding videos and/or sounds. Viewing users, however, may be users who can not only receive such information but also react to the information, instead. For example, viewing users may be users who view video streaming or collaborated streaming or participate in and/or view a video chat, a voice chat, or an event. Viewing users in the present disclosure, therefore, can also be referred to as guest users, participating users, listeners, watching users, or supporting users.

The information processing system according to the embodiment of the present disclosure may be used to provide next-generation Internet spaces (metaverse), which are digital worlds where a large number of persons can participate simultaneously, engage in free activities, such as interaction, work, and play through character objects (avatars), on a level close to that in a real world, and undertake social activities beyond a gap between reality and virtuality.

In such a metaverse space, users' avatars can freely walk in a world and communicate with one another.

One of a plurality of avatars (character objects) in such a metaverse space may be capable of streaming a video as a character object of a streaming user. That is, in a many-to-many metaverse space, one-to-many video streaming may be performed.

In such a metaverse space, streaming users and viewing users need not be particularly distinguished from each other.

Next, characteristic elements of motions of avatars in a virtual space will be described with reference to FIGS. 4 to 9.

Figure 4:
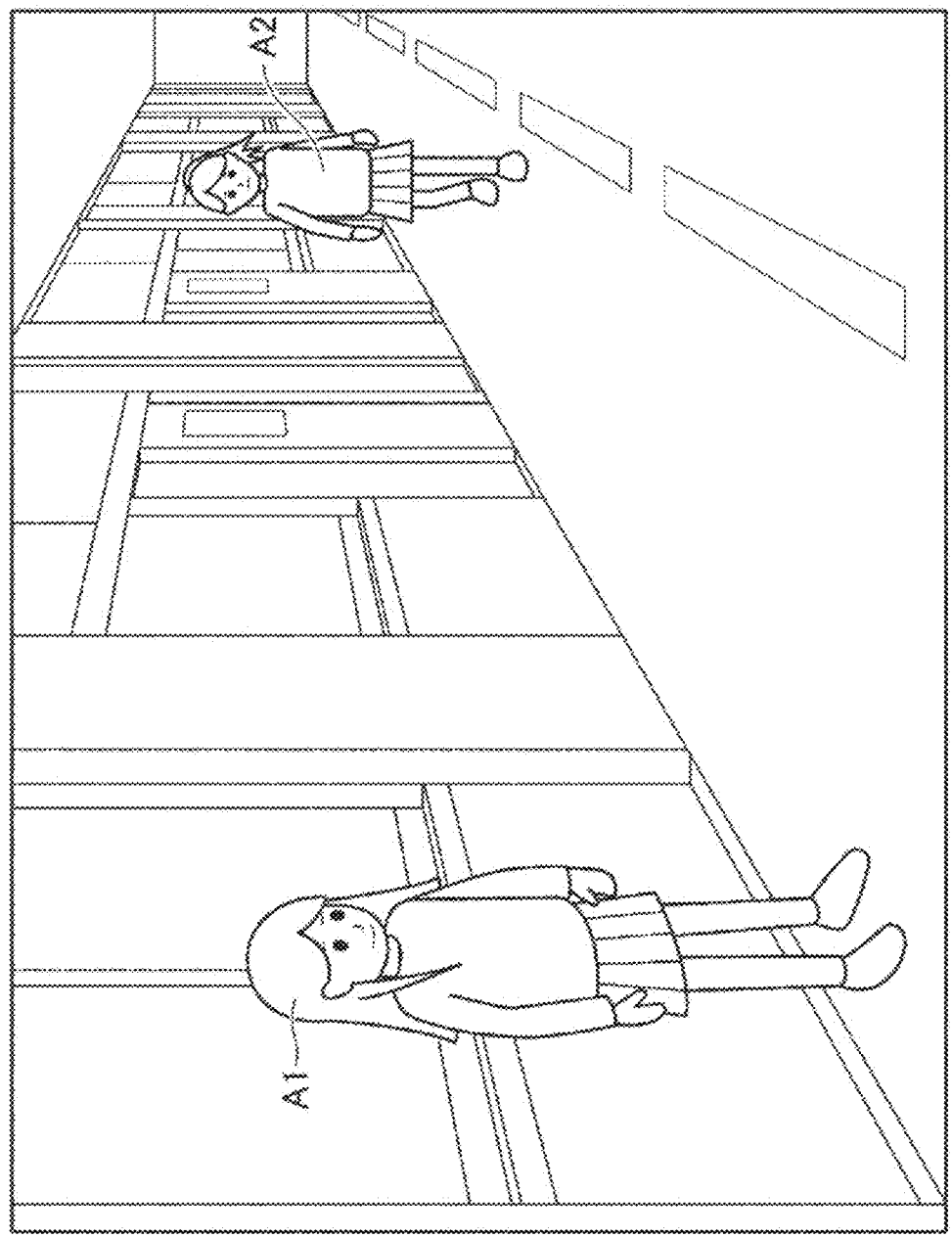
FIG. 4 is a diagram illustrating an example of a first scene in a virtual space where an automatic reaction is triggered.
Figure 5:
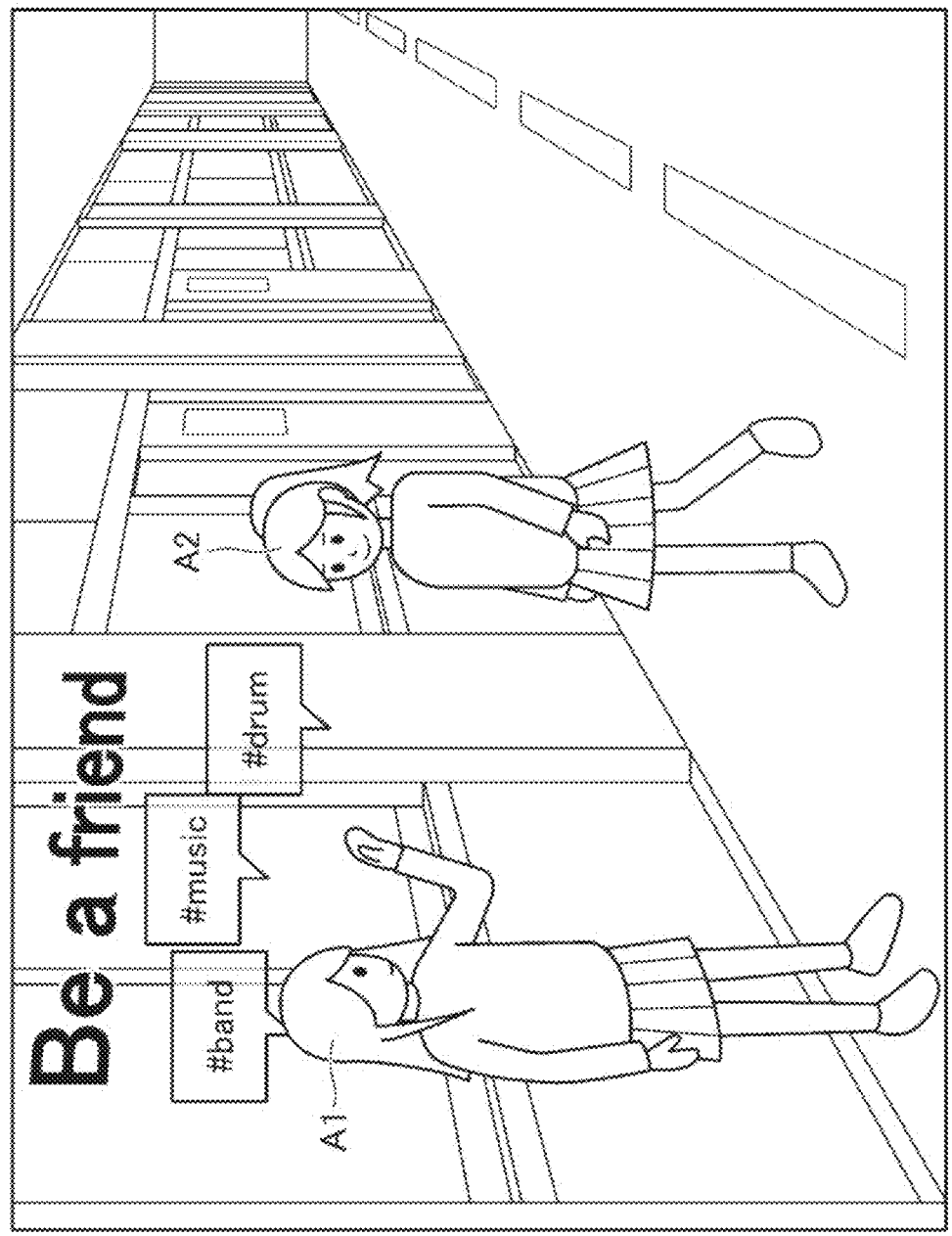
FIG. 5 is a diagram illustrating an example of a second scene in the virtual space where the automatic reaction is triggered.
Figure 6:
FIG. 6 is a diagram illustrating an example of another first scene in a virtual space where an automatic reaction is triggered.
Figure 7:
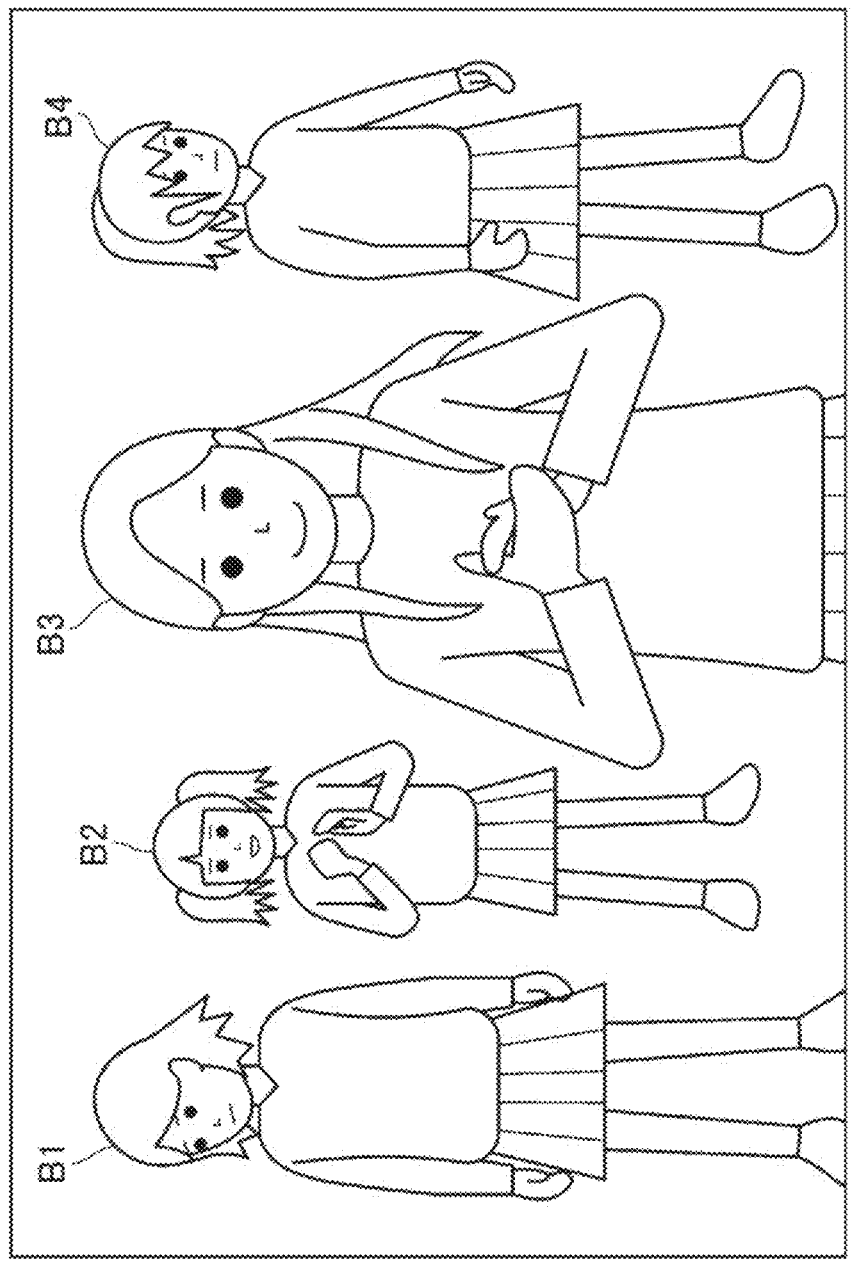
FIG. 7 is a diagram illustrating an example of another second scene in the virtual space where the automatic reaction is triggered.
Figure 8:
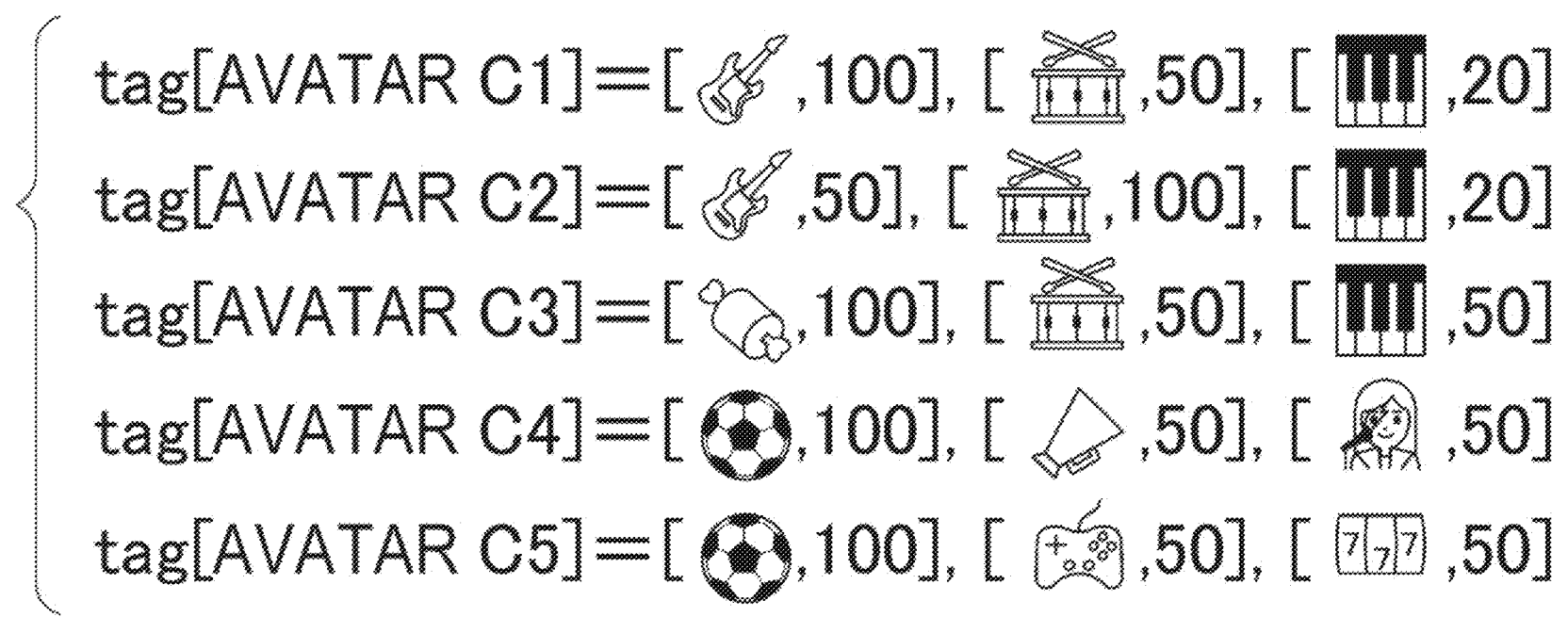
Figure 9:
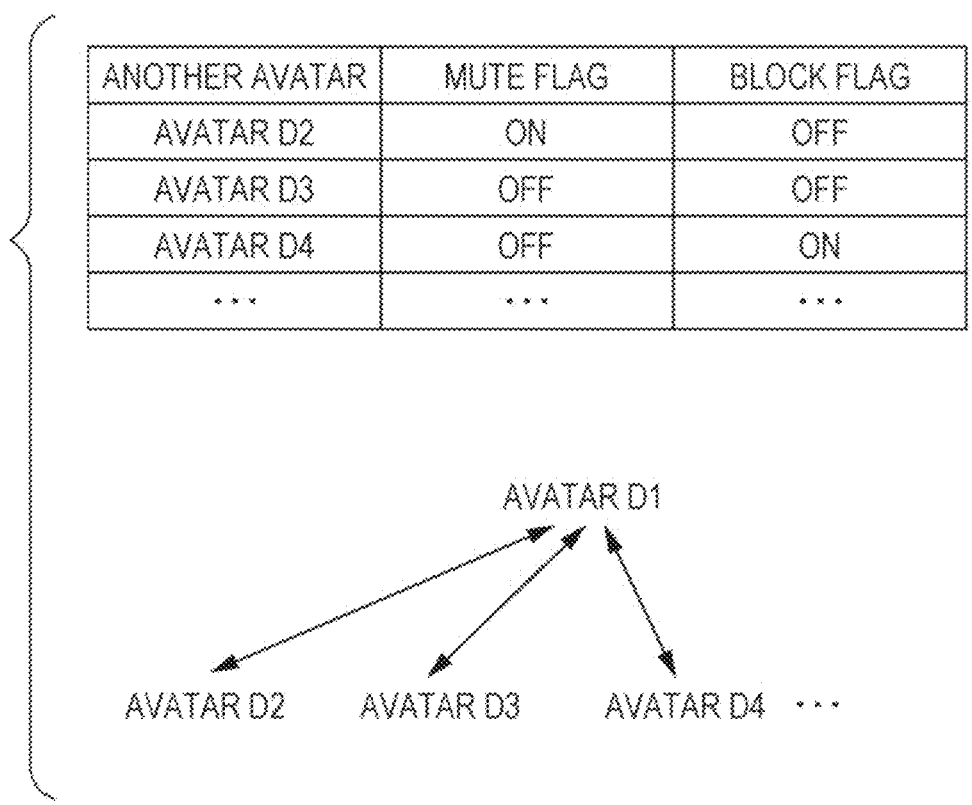
FIG. 9 is a diagram illustrating limiting flags.

FIGS. 4 and 5 are diagrams illustrating an example of a scene in the virtual space where an automatic reaction is triggered. FIGS. 6 and 7 are diagrams illustrating another example of the scene in the virtual space where an automatic reaction is triggered. FIG. 8 is a diagram illustrating inter-word distances based on tag information. FIG. 9 is a diagram illustrating control flags.

Various objects (e.g., a soccer ball and a piano) mentioned in the following description are objects in the virtual space and different from those in reality, unless otherwise noted. Various events mentioned in the following description are various events (e.g., concerts) in the virtual space and different from those in reality. When an avatar obtains (gets) an object in the following description, a state where the object is not associated with the avatar changes to a state where the object is associated with the avatar. Since an avatar and a user associated with the avatar can be identified with each other as described above, avatars and users might not be distinguished from each other in the following description. A user may be associated with a plurality of avatars, but in this case, too, the user selects one of the avatars and acts in the virtual space. For this reason, in this case, too, an avatar and a user associated with the avatar can be identified with each other at each point in time.

In the present embodiment, motions of avatars in the virtual space include certain motions (hereinafter referred to as "automatic reactions") based on text information along with normal motions based on user inputs. In the following description, an avatar for which whether to perform automatic reactions is determined or an avatar that performs automatic reactions (an example of a second avatar) will be referred to as a "reaction-oriented avatar". In this case, the automatic reactions are automatic motions based on text information associated with the reaction-oriented avatar. The text information may be information indicating tastes of the reaction-oriented avatar or a user (hereinafter also referred to as a "target user") associated with the reaction-oriented avatar. The text information may indicate, for example, favorite people, favorite things, unfavorite people, unfavorite things, favorite attributes, and unfavorite attributes. The text information may also indicate a personality (cheerful, gloomy, etc.). The text information may also include profile information associated with the reaction-oriented avatar. The text information may be automatically generated in accordance with various activities (conversation/speech information, an activity history, etc.) of the avatar in the virtual space. Other specific examples of the text information will be described later.

Automatic reactions are reactions automatically triggered for other objects, other avatars, and the like. Since automatic reactions are automatically triggered, no particular user inputs are needed. Whether to trigger automatic reactions, however, may be set for each avatar. In this case, automatic reactions may be automatically triggered for each avatar for which the automatic reactions have been enabled.

Automatic reactions may be drawn on the basis of animation data prepared in advance. Although the present disclosure aims to effectively facilitate interaction between avatars, types of automatic reaction are limited because tracking of automatic reactions of a process target avatar for all of specific actions by other avatars can excessively increase a processing load and it might be difficult to react in a timely manner in important scenes (e.g., first meetings) if the process target avatar is slow to react or it takes time to transmit motion data due to communication conditions. Since automatic reactions can be triggered regardless of user inputs, user inputs (e.g., tracking information based on motion capture) need not be obtained constantly. As a result, a communication load can be effectively reduced. In addition, since automatic reactions are automatically triggered, avatars (users) need not react or select emotes, which improves convenience.

When an automatic reaction is drawn, the server apparatus 10 may transmit, to the terminal apparatus 20, motion data indicating how to move an avatar, and the terminal apparatus 20 may move the avatar on the basis of the motion data. For example, motion data may be blended with an animation generated by the server apparatus 10 in advance, and the terminal apparatus 20 may track the animation to achieve an automatic reaction. More specifically, when a user is moving an avatar on the screen of the terminal apparatus 20 using a joystick (control on the screen), the avatar's head or gaze may be automatically directed to other avatars that the user is interested in. Alternatively, the server apparatus 10 may automatically produce (display) a smiling face emote or heart particles for the terminal apparatus 20. Alternatively, a stamp or an animated graphics interchange format (GIF) may be displayed over the avatar's head or in a balloon. Although, as described later, the server apparatus 10 determines whether to trigger automatic reactions in the present disclosure, the terminal apparatus 20 may make the determination instead of, or in addition to, the server apparatus 10. In an actual computer graphics (CG) space where automatic reactions are drawn, slight movements and motions of avatars might not be properly displayed depending on display resolution and conditions of other objects displayed. As a measure against such a situation, there is a process based on level of detail (LoD), which refers to a three-dimensional distance too large to distinguish, with display pixels, detailed bone information, such as fingers, a gaze, and facial expressions, and directed images to be communicated. A developer automatically or explicitly manages the LoD in a game engine, but in the present disclosure, information may be culled, communication traffic may be compressed, drawing costs may be reduced, and cache hit rates may be improved effectively by using level of interest (LoI), which refers to a distance between avatars that serves as a threshold for an automatic reaction, in addition to a relationship between three-dimensional positions at which avatars are to be actually displayed.

Drawing based on animation data may be applied to only a certain part of an avatar. The certain part relates to an automatic reaction and, when the automatic reaction is raising of a hand to greet someone, for example, may be the avatar's hand. In this case, other parts of the avatar may be drawn using inverse kinematics. With this configuration, parts among the parts other than the certain part that are not related to movement of the certain part may be drawn on the basis of a user operation, and a personality of the avatar can be expressed in this case. The number of certain parts may be one or more, and an animation may be achieved through coordinated movement of a plurality of parts. In the case of a greeting, for example, a head may be tilted while waving a hand.

When facial expressions (e.g., movement of the eyes, the mouth, and other parts of the face) of avatars and other related parts (hair, hair ornaments, etc.) can be drawn, a facial expression of an avatar and movement of other related parts during an automatic reaction may also be drawn as an animation or on the basis of a user operation. When facial expressions (e.g., movement of the eyes, the mouth, and other parts of the face) of avatars can be drawn, a facial expression of an avatar during an automatic reaction may be drawn on the basis of face image information regarding a user and tracking information obtained through motion capture (e.g., face capture).

When a certain trigger condition is satisfied, an automatic reaction may be triggered regardless of (i.e., automatically) a subsequent user input. The certain trigger condition may be a condition based on text information associated with a reaction-oriented avatar or a target user (hereinafter typified as "text information associated with a reaction-oriented avatar"). That is, whether the certain trigger condition is satisfied may be determined on the basis of text information associated with a reaction-oriented avatar.

The automatic reactions may be any motions for facilitating interaction between avatars in the virtual space. For example, the automatic reactions include a praiseful motion such as clapping, a smiling motion, a greeting motion, a pose or an action for showing friendly feelings (a thumbs-up etc.), a motion for talking to another avatar, a motion for giving a gift or a letter to another avatar, other favorable emote motions, and various motions of these kinds. The automatic reactions may also include any combinations of these motions.

When a reaction-oriented avatar smiles at another avatar as an automatic reaction, for example, interaction between the avatars might be facilitated even if the reaction-oriented avatar and the other avatar have never met before. For example, the other avatar might notice the presence of the smiling reaction-oriented avatar and talk to the reaction-oriented avatar to start a conversation.

The automatic reactions may thus be motions intended for another avatar (hereinafter referred to as a "companion avatar") (an example of a first avatar). Whether the certain trigger condition is satisfied, therefore, may be determined when a reaction-oriented avatar and another avatar that can be a companion avatar have a certain positional relationship (hereinafter referred to as a "first certain positional relationship") in the virtual space. The automatic reactions can thus be triggered at appropriate times while reducing the processing load.

The first certain positional relationship may be any relationship, but may include a positional relationship where a reaction-oriented avatar and another avatar that can be a companion avatar are located within a certain distance from each other (e.g., a three-dimensional spatial distance or a two-dimensional distance in the virtual space) or where another avatar that can be a companion avatar can see a reaction-oriented avatar (i.e., a positional relationship where another avatar can see the reaction-oriented avatar). Alternatively, the first certain positional relationship may include a positional relationship where another avatar that can be a companion avatar does not currently see a reaction-oriented avatar but can see the reaction-oriented avatar if the other avatar's perspective changes (e.g., if an orientation of the other avatar's face or body changes).

FIGS. 4 and 5 illustrate a scene where an automatic reaction can be triggered. An avatar A1, which is a reaction-oriented avatar, is standing in a school hallway, and another avatar A2 is walking toward the avatar A1. It is assumed that the avatars A1 and A2 have never met before or have yet to break the ice. It is also assumed that the avatars A1 and A2 are interested in the same things (e.g., music and bands) according to text information associated therewith. In FIG. 5, the certain trigger condition is satisfied, and the avatar A1, which is the reaction-oriented avatar, raises its hand to greet the avatar A2 as the automatic reaction.

In the scene illustrated in FIGS. 4 and 5, the certain trigger condition may be satisfied when text information associated with the avatar A1 and text information associated with the avatar A2 have a certain relationship. The certain relationship may include a relationship where the text information associated with the avatars A1 and A2 has something in common. The certain trigger condition used for a determination on the basis of the relationship of text information will be referred to as a "first certain trigger condition" hereinafter.

When the avatar A1 triggers the automatic reaction in this manner, a perspective of a virtual camera associated with the avatar A2 may be changed in such a way as to include the reaction-oriented avatar A1. That is, a perspective of the avatar A2 may be changed such that the avatar A2 can clearly see the reaction-oriented avatar A1. Alternatively, after the automatic reaction starts, guidance information for notifying the avatar A2 of a position of the reaction-oriented avatar A1 may be generated. Changes of perspectives of virtual cameras and guidance information are effective in metaverse spaces. That is, by increasing a degree of freedom of changes in a point of view, changes of perspectives and guidance information become effective in metaverse spaces, where a large amount of information is displayed.

When the avatar A2 notices the reaction-oriented avatar A1, interaction between the avatars A1 and A2 is facilitated. Since the avatars A1 and A2 are interested in the same things (e.g., music and bands) according to the text information associated therewith, the avatars A1 and A2 are likely to become friends once the avatars A1 and A2 talk to each other, thereby achieving efficient facilitation of interaction. In addition, since avatars (users) having the same text information (i.e., the same tastes) can find each other easily, frequencies at which the users use the virtual space and percentage of users who continue to use the virtual space can be effectively increased.

In the scene illustrated in FIGS. 4 and 5, the avatar A2 may trigger an automatic reaction for the reaction-oriented avatar A1 in response. In this case, both the avatars A1 and A2 trigger the automatic reactions, which efficiently facilitate interaction.

In the present embodiment, when the avatar A1 triggers the automatic reaction, tag information ("#band", "#music", and "#drum" in FIG. 5) may be displayed above the head of the avatar A1 while being associated with the avatar A1. The tag information may be displayed in a mode where only the avatar A2 can recognize the tag information or in a mode where other nearby avatars can also recognize the tag information. The tag information may be part or the entirety of the text information or may be generated by converting or processing part or the entirety of the text information. When tag information that is not common to the avatars A1 and A2 is also displayed in addition to the tag information common to the avatars A1 and A2, the tag information common to the avatars A1 and A2 may be highlighted. Alternatively, only the tag information common to the avatars A1 and A2 may be displayed. In any case, the avatar A2 can immediately recognize common points between the avatar A2 and the avatar A1 even when the avatar A2 has never met the avatar A1 before, which facilitates a subsequent conversation and the like. The tag information may be displayed as an automatic reaction or part of an automatic reaction. Alternatively, the tag information may be displayed before the avatar A1 triggers the automatic reaction (refer to FIG. 3).

Alternatively, when the avatar A1 triggers the automatic reaction, message information ("Be a friend" in FIG. 5), may be displayed above the head of the avatar A1 while being associated with the avatar A1. In this case, the message information may be automatically determined or set by the avatar A1 in advance. In any case, the avatar A2 can easily understand an intention of the avatar A1 (i.e., an intention of the automatic reaction triggered by the avatar A1), which facilitates a subsequent conversation and the like. The message information may be displayed as an automatic reaction or part of an automatic reaction.

Although the automatic reaction is raising of a hand to greet someone in the example illustrated in FIGS. 4 and 5, a type of automatic reaction to be triggered is not limited to this. The automatic reaction may be selected (determined), on the basis of a certain rule, from a plurality of types of motion including favorable reactions to a companion avatar. For example, the type of automatic reaction may be determined in accordance with the text information associated with the avatars A1 and A2, instead. For example, the type of automatic reaction may be determined in accordance with, in all the text information associated with the avatars A1 and A2, text information having the above-described certain relationship, instead. In this case, automatic reactions that suit avatars' personalities can be triggered. As a result, automatic reactions can be diversified and reflect the avatars' personalities.

In addition, the automatic reaction may be changed in accordance with a degree of commonality in text information. In the example illustrated in FIGS. 4 and 5, for example, the automatic reaction may be different between when the text information associated with the avatar A1 and the text information associated with the avatar A2 have a first certain relationship and when the text information associated with the avatar A1 and the text information associated with the avatar A2 have a second certain relationship. In the case of the second certain relationship, for example, the automatic reaction may be highlighted to be more conspicuous than in the case of the first certain relationship. Whereas the automatic reaction is raising of a hand to greet someone in the case of the first certain relationship, for example, the automatic reaction may be raising and waving of a hand to greet someone in the case of the second certain relationship. Alternatively, waving of a hand may be employed in both the case of the first certain relationship and the case of the second certain relationship, but in the case of the second certain relationship, the hand may be waved more vigorously than in the case of the first certain relationship. In any case, the second certain relationship may be a relationship where the avatars A1 and A2 have more common points in the text information (e.g., inter-word distances, which will be described later, are smaller) than in the first certain relationship.

FIGS. 6 and 7 illustrate another scene where an automatic reaction can be triggered. An avatar B5 is performing a specific action (soccer ball juggling in this case) on a stage in a school gymnasium, and four avatars B1 to B4 are standing beside the avatar B5. It is assumed that the avatar B5 and the avatars B1 to B4 have never met before or have yet to break the ice. It is assumed that the avatars B2 and B3 among the avatars B1 to B4 are interested in a thing (e.g., soccer or sports in general) relating to the specific action performed by the avatar B5 according to text information associated therewith. In FIG. 7, a certain trigger condition is satisfied only for the avatars B2 and B3, and the avatars B2 and B3, which are reaction-oriented avatars, claps their hands for the avatar B5, which is a companion avatar, as an automatic reaction.

In the scene illustrated in FIGS. 6 and 7, the certain trigger condition may be satisfied when an attribute of the specific action performed by the avatar B5 and the text information associated with the avatar B2 or B3 have a certain relationship. The certain relationship may include a relationship where an attribute of a specific action and text information have something in common. The certain trigger condition used for a determination on the basis of the relationship between an attribute of a specific action and text information will be referred to as a "second certain trigger condition" hereinafter in order to distinguish the certain trigger condition from the above-described first certain trigger condition. Although not illustrated, the following trigger condition may be defined as a "third certain trigger condition". That is, whereas the first trigger condition is that text information have a certain relationship and the second trigger condition is that a specific action and text information have a certain relationship, the third trigger condition may be that two specific actions have a certain relationship. In the example illustrated in FIGS. 6 and 7, an automatic reaction based on the third trigger condition is, for example, the avatars B3 and B5 looking at each other and greeting each other, nodding at an end of a conversation (e.g., at a break in a conversation), or clapping their hands for each other after the avatar B3 performs a specific action (soccer ball juggling in this case) together with the avatar B5. Alternatively, when a state machine, which is used to control an animation, is changed or a certain state is established, the same state may be output, or the nearby avatar B2 may clap its hands after the target avatars B3 and B5 finish the certain action.

When the avatars B2 and B3 trigger the automatic reaction, a perspective of a virtual camera relating to the avatar B5 may be changed in such a way as to include the avatars B2 and B3. That is, a perspective of the avatar B5 may be changed such that the avatar B5 can clearly see the reaction-oriented avatars B2 and B3. Alternatively, when the automatic reaction starts, guidance information for notifying the avatar B5 of positions of the reaction-oriented avatars B2 and B3 (presence of the avatars B2 and B3 clapping their hands) may be generated. Changes of perspectives of virtual cameras and guidance information are effective in metaverse spaces. That is, by increasing a degree of freedom of changes in a point of view as described above, changes of perspectives and guidance information become effective in metaverse spaces, where a large amount of information is displayed.

When the avatar B5 notices the reaction-oriented avatars B2 and B3, interaction between the avatars B2 and B3 and the avatar B5 is facilitated. Since the avatars B2 and B3 and the avatar B5 are interested in the same thing (e.g., soccer or sports in general) according to the text information associated therewith, the avatars B2 and B3 and the avatar B5 are likely to become friends once the avatars B2 and B3 and the avatar B5 talk to each other, thereby achieving efficient facilitation of interaction.

In the scene illustrated in FIGS. 6 and 7, when the avatar B2 triggers the automatic reaction, a perspective of a virtual camera relating to the avatar B3 may be changed in such a way as to include the avatar B2. Alternatively, guidance information for notifying the avatar B3 of presence of the other avatar B2 clapping its hands may be generated. The same holds for the avatar B2. That is, when the avatar B3 triggers the automatic reaction, a perspective of a virtual camera relating to the avatar B2 may be changed in such a way as to include the avatar B3. Alternatively, guidance information for notifying the avatar B2 of presence of the other avatar B3 clapping its hands may be generated. As a result, interaction between the avatars B2 and B3 may be facilitated. That is, since the avatars B2 and B3 are interested in the same thing (e.g., soccer or sports in general) according to the text information associated therewith, the avatars B2 and B3 are likely to become friends once the avatars B2 an B3 talk to each other, thereby achieving efficient facilitation of interaction. Since avatars (users) having the same tastes can find each other easily, the frequencies at which the users use the virtual space and the percentage of users who continue to use the virtual space can be effectively increased.

Although the automatic reaction is clapping of hands in the example illustrated in FIGS. 6 and 7, a type of automatic reaction is not limited to this. The automatic reaction for the specific action may be selected (determined) on the basis of a certain rule from a plurality of types of motion including favorable reactions to a companion avatar. For example, the type of automatic reaction may be determined in accordance with an attribute of the specific action. Since the specific action is soccer ball juggling in this case, for example, the automatic reaction may relate to soccer or sports in general. Alternatively, the type of automatic reaction may be determined in accordance with, in all the text information associated with the avatars B2 and B3, text information having a certain relationship with the attribute of the specific action performed by the avatar B5, instead. In this case, automatic reactions that suit avatars' personalities can be triggered. As a result, automatic reactions can be diversified and reflect the avatars' personalities.

A specific action performed by an avatar may be achieved (drawn) on the basis of tracking information (e.g., tracking information regarding each part through motion capture) regarding a user corresponding to the avatar, but is drawn using animation data. In this case, the processing load can be reduced since all motions of the users need not be tracked, and a specific action performed by each avatar can be efficiently expressed (drawn).

In the present embodiment, the above-described automatic reaction is triggered when the certain trigger condition is satisfied. Whereas automatic reactions are effective in facilitating interaction between avatars as described above, the automatic reactions undesirably increase the processing load. Whether the certain trigger condition is satisfied, therefore, is desirably efficiently determined.

For this reason, whether a certain trigger condition is satisfied is determined using an inter-word distance based on text information. With a configuration where the certain trigger condition relating to a reaction-oriented avatar is satisfied when text information associated with the reaction-oriented avatar and text information associated with another avatar that can be a companion avatar have a certain relationship, for example, whether the text information has the certain relationship may be determined using an inter-word distance based on the text information. Word embeddings in natural language processing such as Word2vec may be used. In Word2vec, word vectors located close to each other in a vector space among characters (words) included in text information may be determined to have the certain relationship. When natural language processing is employed, whether there is the certain relationship (and whether the certain trigger condition is satisfied) can be efficiently determined. Whether the certain trigger condition is satisfied can be efficiently determined for a wide variety of languages.

In the scene illustrated in FIGS. 4 and 5, for example, the certain relationship may include, as described above, a relationship where an inter-word distance (relationship) between the text information associated with the avatar A1 and the text information associated with the avatar A2 is smaller than or equal to a certain distance. In Word2vec, if one or more pairs of word vectors are located close to each other in a vector space among characters (words) included in the text information, the first certain trigger condition may be satisfied.

In the scene illustrated in FIGS. 6 and 7, the second certain trigger condition may be satisfied, as described above, depending on whether an inter-word distance (relationship) between a word relating to the specific action performed by the avatar B5 and the text information associated with each of the avatars B1 to B4 is smaller than or equal to the certain distance included in the certain relationship. In Word2vec, whether one or more pairs of word vectors are located close to each other in a vector space among characters (words) included in the text information may be determined for each of the avatars B1 to B4 in relation to the word relating to the specific action performed by the avatar B5.

Text information used to calculate an inter-word distance may include tag information. FIG. 8 illustrates an example of tag information associated with a plurality of avatars. In FIG. 8, "tag[avatar C1]" indicates tag information associated with an avatar C1. In information [*, 100] illustrated in FIG. 8, "*" may be characters, namely, for example, an emoji such as one illustrated in FIG. 8. Since meanings of emojis are universally understandable, convenience improves. Values such as "100" indicate a weight associated with corresponding characters, and a greater weight indicates a stronger preference of a corresponding avatar. Weights may be used, therefore, such that a degree of commonality increases as a "distance" between heavy characters becomes smaller. In this case, an inter-word distance (relationship) between the avatar C1 and an avatar C2 based on tag information is small, and a certain trigger condition tends to be satisfied.

The certain trigger condition based on tag information may be satisfied when the tag information has a certain relationship. The certain relationship may be varied stepwise. In a strictest case, the certain relationship may be perfect matching between words relating to tag information, for example, and in a looser case, meanings of tags may be taken into consideration. "#music" and "#singer", for example, may be determined to have the certain relationship. Whether the certain trigger condition based on tag information is satisfied may be determined through comparison across different languages. In this case, "#yakyu" ("baseball" in Japanese) and "#baseball" may be determined to have the certain relationship.

Integration and the number of persons subjected to the integration will be described. It might be better to separate words having the same meaning, namely "#baseball", "#pro-yakyu", "#yakyu", and an emoji of a baseball, for example, from one another on the basis of language or culture, but it is sometimes better to integrate these words together so that avatars having similar tastes can find each other and meet more easily. This condition can be achieved by constructing a database on the basis of a language or a cultural sphere, but it is also rational to adjust a database on the basis of the number of users to meet. When it is desirable to efficiently group (integrate) users having hobbies relating to baseball in a world where a total of 10 users, namely five native Japanese speakers and five other users, for example, a straight line for dividing the 10 users into two groups of five users in a semantic space can be assumed, and the 10 users can be classified into the two groups in accordance with languages or words divided by the straight line. Among the 10 users, the five native Japanese speakers have tags like "#pro-yakyu" and "#yakyu", and the five other users have tags like "#baseball", the emoji of a baseball, and "#MLB", and it is rational to actively group (integrate) the former users. In machine learning, the division can be performed using general algorithms such as support vector machines (SVMs).

As described above with reference to FIG. 5, such tag information can be used to not only calculate inter-word distances but also facilitate interaction between avatars when displayed above heads of the avatars and associated with the avatars. Tag information associated with an avatar, for example, may be displayed to another avatar only when one or any combination of the following condition elements C1 to C4 is satisfied.

Condition element C1: The same tag information is associated with the avatar and the other avatar.

Condition element C2: The avatar and the other avatar have a certain positional relationship.

Condition element C3: The avatar and the other avatar have a specific intimate relationship.

Condition element C4: The other avatar has requested the avatar to display the tag information.

In the condition element C2, the certain positional relationship may include, as with the first certain positional relationship, a relationship where the avatar and the other avatar are located within a certain distance and a positional relationship where the other avatar that can be a companion avatar can see the avatar (i.e., a positional relationship where the other avatar can see the avatar). In the condition element C3, the specific intimate relationship may include a relationship where the avatar is registered in user information (described later) regarding the other avatar as friend information, a relationship where both avatars are registered in the user information (described later) regarding the avatars as friend information, a relationship where the avatar and the other avatar are registered in the user information (described later) as a follower and a followee, or any combination of these.

When there is a beginner mode, tag information may be displayed above a head of an avatar for which the beginner mode is set. In this case, the tag information may include a beginner mark. Alternatively, the beginner mark may be attached to a costume of an avatar. A skilled user can select the beginner mode, but an avatar and a name thereof may be displayed in this case. When a plurality of modes such as an intermediate mode and an advanced mode are set in addition to the beginner mode, users may be able to manually select one of the modes, or one of the modes may be automatically set in accordance with the number of days or the number of times of login since each user has been registered to the service.

When tag information associated with an avatar is displayed to another avatar as conditions including the condition element C4 are satisfied, information indicating that the tag information has been displayed may be fed back to the avatar. The feedback may be achieved through a displayed indication and/or vibration (e.g., vibration of the input unit 24), for example, indicating that the tag information has been viewed. This is not limited to tag information and may hold true for profile information or the like.

The above-described automatic reactions can facilitate interaction between avatars in a virtual space with a reduced processing load as described above, but when avatar density increases, frequency of automatic reactions accordingly increases, and as a result, the processing load becomes large.

In the present embodiment, therefore, interaction between avatars may be limited automatically or on the basis of user settings.

A method for limiting interaction between avatars may be achieved using limiting flags such as a block flag and a mute flag. The limiting flags such as the block flag and the mute flag may be managed for each avatar while being associated with the other avatars. FIG. 9 is a diagram illustrating the limiting flags. FIG. 9 illustrates an example of states of the limiting flags, for an avatar D1, associated with other avatars D2, D3, and D4. The avatar D1 has set the limiting flags illustrated in FIG. 9 as schematically illustrated in a lower part of FIG. 9. In this case, the avatar D1 can set the limiting flags for interaction with the other avatars D2, D3, and D4 as desired. In the states illustrated in FIG. 9, the avatar D1 has turned on the mute flag for the avatar D2, has not turned on either the block flag or the mute flag for the avatar D3, and has turned on the block flag for the avatar D4.

In this case, the avatar D2, for which the mute flag has been turned on, does not essentially exist for the avatar D1, and the avatar D1 cannot see, talk to, or hear the avatar D2. That is, the avatar D2 is not on a list (an available user register) in a virtual space where the avatar D1 exists. Interaction between the avatar D1 and the avatar D2, therefore, need not be facilitated, and automatic reactions are not triggered between the avatars D1 and D2. As a result, various processes (e.g., the determination as to the first certain positional relationship and the determination whether the certain trigger condition is satisfied) are not necessary between the avatars D1 and D2, thereby efficiently reducing the processing load. In addition, the avatar D1 can make an avatar with whom the avatar D1 does not desire to interact as a "nonexistent avatar", which improves convenience.

Muting and blocking will be described hereinafter. The avatar D1 is an avatar for which the muting and the blocking are available and the avatar D2 is an avatar that is muted and blocked, and an automatic reaction of the avatar D1 is not triggered for the avatar D2. First, as for the muting, the avatar D1 cannot see the avatar D2, but the avatar D2 can see the avatar D1. In other words, the avatar D2 is not a target of a determination whether the avatar D1 is to trigger the automatic reaction. With respect to voice conversations, too, the avatar D2 can hear voice of the avatar D1, but the avatar D1 cannot hear voice of the avatar D2. With respect to text chats, speech text of the avatar D2 is not displayed to the avatar D1, and mention and notifications from the avatar D2 are not processed for the avatar D1. The avatar D2 only sees and hears the avatar D1 and no interaction is permitted, but the avatar D2 need not recognize that it has been muted. The avatar D1 may cancel the muting of the avatar D2 at any time on a mute target list. Next, as for the blocking, the avatar D1 explicitly rejects the avatar D2. Until the avatar D1 removes the avatar D2 on a block target list, the avatar D2 cannot find the avatar D1, that is, the avatar D1 is nonexistent to the avatar D2. Even when the avatars D1 and D2 exist in the same world, the terminal apparatus 20 of the avatar D2 does not display the avatar D1 or output voice or text of the avatar D1. The muting and the blocking may be set in accordance with each avatar's (user's) tastes or experience or may be set as default settings. The muting and the blocking may be set by the provider of the virtual reality for a purpose such as communication control, an event such as a festival, or a tutorial (individual guidance) for a beginner user or dynamically controlled in accordance with the above-described LoI between avatars in consideration of a CG space where automatic reactions are drawn.

Unlike the avatar D2, the avatar D4, for which the block flag has been turned on, is existent to the avatar D1, but the avatar D4 cannot talk to or approach the avatar D1. The avatar D4 cannot view profile information and tag information regarding the avatar D1, either. For example, the condition element C4 is not satisfied for the avatar D4 with respect to the tag information regarding the avatar D1. Interaction between the avatar D1 and the avatar D4 need not essentially be facilitated, and automatic reactions are not triggered between the avatars D1 and D4. As a result, various processes for triggering automatic reactions need not be performed between the avatars D1 and D4, which efficiently reduces the processing load. The avatar D4 may be able to recognize that the avatar D1 has turned on the block flag therefor.

When the limiting flags are used in this manner, automatic reactions tend to be triggered between avatars with whom interaction can be effectively facilitated. As a result, opportunities to trigger automatic reactions are not unnecessarily limited, thereby efficiently reducing the processing load.

In the present embodiment, the on/off states of the limiting flags may be changed in accordance with user inputs of corresponding users and/or automatically on the basis of text information. If text information associated with an avatar includes "bragging" as an unfavorite thing, for example, interaction between the avatar and another avatar that frequently brags may be limited. Whether an avatar frequently brags may be determined on the basis of conversation/speech information regarding the avatar.

In the present embodiment, automatic reactions may be limited in accordance with, for example, a processing load caused by avatar density in a virtual space. In an area of a virtual space where avatar density is high (e.g., a concert venue), for example, the above-described automatic reactions may be limited. In this case, the function of automatic reactions may be disabled, or a certain trigger condition may be automatically changed such that the certain trigger condition is hardly satisfied. It may be assumed, for example, that when text information associated with an avatar and text information associated with more than a certain number of other avatars have the first certain relationship in an area of a virtual space where avatar density is high, the processing load significantly increases. In this case, an automatic reaction may be triggered only for, among more than the certain number of other avatars, an avatar associated with text information having the second certain relationship. In this case, the second certain relationship may be a relationship where avatars have more common points in text information than in the first certain relationship. Alternatively, when text information associated with an avatar and text information associated with more than a certain number of other avatars have a certain relationship in an area in a virtual space where avatar density is high, an automatic reaction may be triggered only for, among more than the certain number of other avatars, an avatar selected randomly or in accordance with a certain rule. Alternatively, automatic reactions may be limited in accordance with properties of an area in a virtual space. In a venue such as a virtual cinema, for example, the function of automatic reactions may be enabled in a lobby where audience is permitted to have conversations and disabled in a theater room where the audience concentrates on a movie, even if there are many empty seats.

Next, an example of the functional configuration of the server apparatus 10 and the terminal apparatuses 20 relating to the above-described automatic reactions of avatars will be described with reference to FIG. 10 and later drawings.

Figure 10:
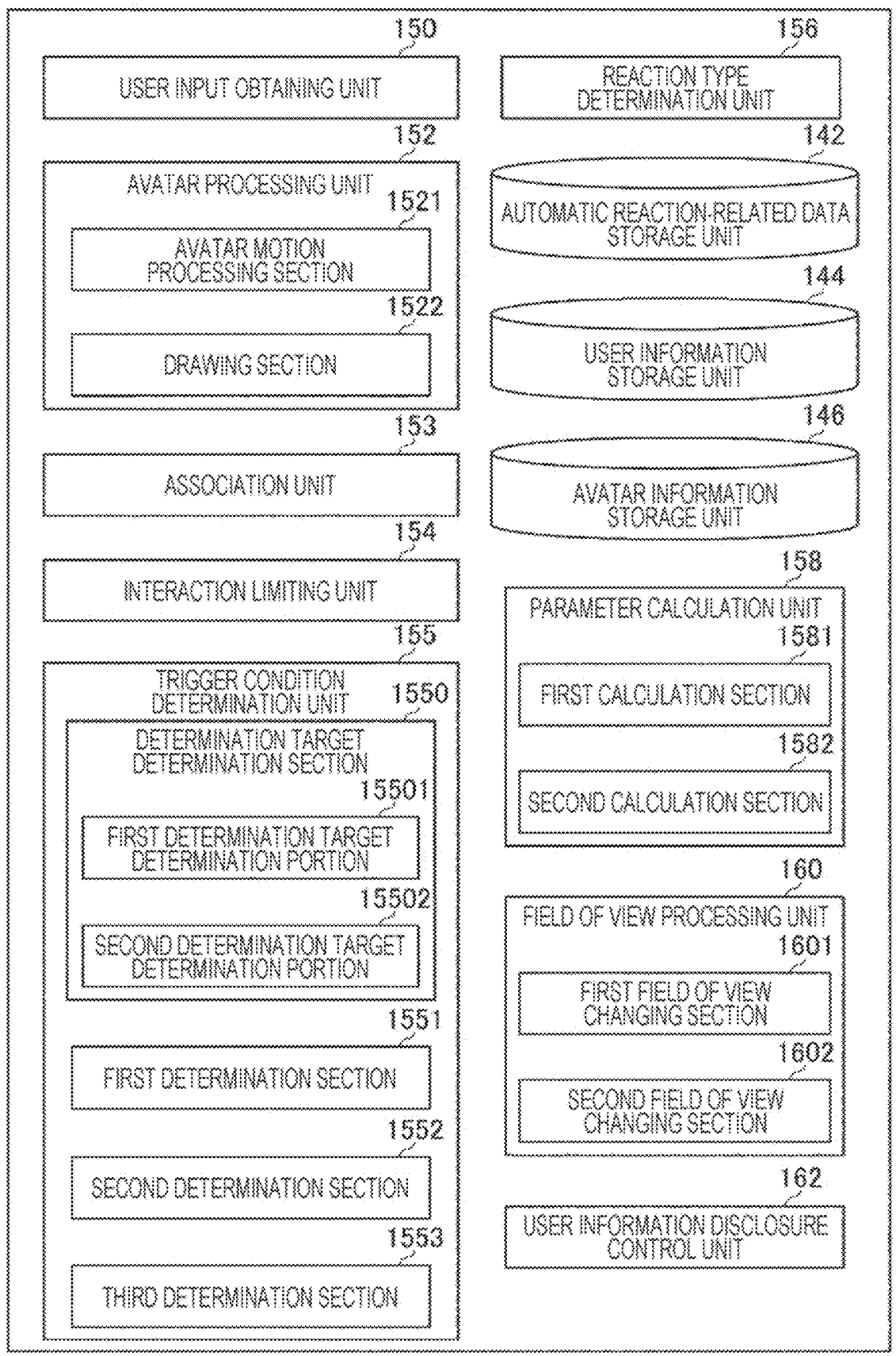
FIG. 10 is a schematic block diagram illustrating functions of a server apparatus relating to automatic reactions.

FIG. 10 is a schematic block diagram illustrating functions of the server apparatus 10 relating to the above-described automatic reactions. FIG. 11 is a diagram illustrating an example of data in an automatic reaction-related data storage unit 142. FIG. 12 is a diagram illustrating an example of data in a user information storage unit 144. FIG. 13 is a diagram illustrating profile information. FIG. 14 is a diagram illustrating an example of data in an avatar information storage unit 146. In FIG. 11 (the same holds true for FIG. 12 and the later drawings), "***" indicates a state where some piece of information is stored, and indicates that similar pieces of information are stored.

As illustrated in FIG. 10, the server apparatus 10 includes the automatic reaction-related data storage unit 142, the user information storage unit 144, the avatar information storage unit 146, a user input obtaining unit 150, an avatar processing unit 152, an association unit 153, an interaction limiting unit 154, a trigger condition determination unit 155, a reaction type determination unit 156, a parameter calculation unit 158, a field of view processing unit 160, and a user information disclosure control unit 162.

In FIG. 10, the automatic reaction-related data storage unit 142, the user information storage unit 144, and the avatar information storage unit 146 can be achieved by the server storage unit 12 of the server apparatus 10 illustrated in FIG. 1. Functions of the user input obtaining unit 150 to the user information disclosure control unit 162 can be achieved by the server control unit 13 or the server communication unit 11 of the server apparatus 10 illustrated in FIG. 1.

The automatic reaction-related data storage unit 142 stores automatic reaction-related data relating to the above-described automatic reactions. The automatic reaction-related data may include, as illustrated in FIG. 11, for example, an automatic reaction attribute, trigger condition information, animation data, and playback information for each automatic reaction identifier (ID).

The automatic reaction ID is automatically generated when each automatic reaction is generated. The automatic reaction attribute indicates an attribute of each automatic reaction, and the attribute of each automatic reaction may include information regarding an intention of the automatic reaction, such as greeting or praise.

The trigger condition information may include information indicating the above-described certain trigger conditions. The trigger condition information may be different between automatic reaction IDs, but is the same (common) between a plurality of automatic reaction IDs. If one of the certain trigger conditions is satisfied, automatic reactions relating to one or more of the plurality of automatic reaction IDs are enabled, thereby diversifying the automatic reactions.

The animation data includes animation data for drawing the above-described automatic reactions. As described above, the animation data may be data regarding movement of only certain parts of reaction-oriented avatars. In this case, the animation data can be generated and shared between a plurality of avatars, which increases efficiency of the animation data. The animation data may be generated on the basis of tracking information obtained when a person (user) has performed an actual motion relating to an automatic reaction. The animation data may be selected in accordance with a type (female (F), male (M), etc.) or an attribute (personality, age (generation), etc.) of each avatar.

The playback information includes basic information indicating times at which playback of the animation data starts and ends. The time at which the playback of the animation data starts may be determined on the basis of a distance between a reaction-oriented avatar and a companion avatar. Alternatively, the time at which the playback of the animation data starts may be synchronized with a time at which it is determined that a certain trigger condition has been satisfied and may be, for example, essentially the same as the time of the determination.

The user information storage unit 144 stores information regarding each user. The information regarding each user may be generated when the user is registered, for example, and updated thereafter as necessary. In the example illustrated in FIG. 12, the user information storage unit 144 stores a user name, an avatar ID, profile information, conversation/speech information, activity information, text information (tag information), friend information, taste information, limiting flag information, item information, and automatic reaction setting information associated with each user ID.

The user ID is automatically generated when each user is registered.

The user name is registered by each user as desired.

The avatar ID indicates an avatar of each user. The avatar ID may be associated with avatar drawing information (refer to FIG. 14) for drawing a corresponding avatar. Avatar drawing information associated with an avatar ID may be added or edited, for example, on the basis of an input of a corresponding user or the like.

As described above, a plurality of avatar IDs may be associated with a user. In this case, the profile information, the conversation/speech information, the activity information, the text information, the friend information, the taste information, the limiting flag information, the item information, and the automatic reaction setting information may be associated with each avatar ID.

The profile information indicates a user profile (or an avatar profile) and is generated on the basis of information input from each user. The profile information may be generated on the basis of, for example, information input from a user illustrated in FIG. 13. The profile information may be selected through a user interface generated on the terminal apparatus 20 and provided for the server apparatus 10 at a JavaScript object notation (JSON) request or the like.

In the present embodiment, the profile information may include information indicating an update mode (update frequency, update amount, etc.). The update mode of the profile information might be different between avatars. The profile information might be updated relatively frequently for some avatars and just once for other avatars.

The conversation/speech information indicates information regarding what a corresponding avatar has spoken in a virtual space. The conversation/speech information may include conversation information regarding conversations between avatars and speech information regarding speech other than the conversations (e.g., monologue and speech during streaming). In this case, the conversation information and the speech information may be managed together or separately in the conversation/speech information. The conversation/speech information may be text data. The conversation/speech information may include information indicating a language (e.g., a locale ID). The conversation/speech information may also include information regarding how to call each avatar in the first person, a way of talking, a dialect, or the like. The conversation/speech information may be raw data before processing (i.e., raw speech logs), but may include text data (data converted into text). In the latter case, efficiency of a storage area can be increased.

The conversation/speech information may also include keyword information. In this case, the keyword information may indicate, for example, keywords included in conversations that have occurred in a chatroom where each user has entered. The keyword information may be generated through text-to-speech (TTS) or the like. The keyword information can accurately indicate each user's tastes or the like and may be used in processing performed by the association unit 153, which will be described later.

The activity information includes information indicating a various activity history and an action history in a virtual space. Various activities may include not only special activities such as participation in events and organization of events but also ordinary activities (actions) such as access to the virtual space and time spent in the virtual space. The various activities may also include object production activities in the virtual space.

The text information is as described above, and may indicate avatars' tastes and the like. The text information may be updated in accordance with an input from each user or the like. The text information may be automatically extracted on the basis of the conversation/speech information, the action history, or the like. As described above with reference to FIGS. 4 and 5, part or the entirety of the text information associated with an avatar may be displayed as tag information while being associated with the avatar. Conversely, tag information may function as the text information. The text information may be metadata, instead.

The friend information may be information (e.g., user IDs) with which users in friend relationships can be identified. As described above, the friend information may include information regarding followers. The friend information may include information regarding other users with whom each user talked in the past, information regarding companion avatars to whom automatic reactions were triggered in the past, and information indicating presence or absence or degrees of interaction and friendship between users.

The taste information may indicate a corresponding user's tastes including tastes in general and tastes relating to conversations (e.g., talk themes). The taste information is optional information and may include each user's preferred language settings and preferred keywords. Each user may be allowed to set favorite people, favorite things, unfavorite people, unfavorite things, and the like in advance, and in this case, the taste information may include corresponding settings. Because the taste information can include the same information as the user profile information, the taste information may be integrated with the user profile information.

The limiting flag information indicates the above-described setting states of the limiting flags by referring to FIG. 9. As described above, each user may be allowed to change the setting states of the limiting flags.

The item information indicates certain items associated with a corresponding user. The certain items may be elements of the above-described virtual reality media and may be virtual reality media indicating each user's tastes. For example, the certain items may include any objects such as avatar items, various musical instruments, and balls.

The automatic reaction setting information is information set by each user regarding whether to trigger the above-described automatic reactions. The automatic reaction setting information can be used to distinguish users who do not desire to trigger the automatic reactions and users who desire to trigger the automatic reactions. Each user may determine whether to trigger an automatic reaction for different scenes, situations, positions, and times.

The avatar information storage unit 146 stores avatar drawing information for drawing an avatar of each user. In the avatar drawing information in the example illustrated in FIG. 14, a face part ID, a hair part ID, a clothes part ID, and the like are associated with each avatar ID. Part information regarding appearances is parameters characterizing each avatar and may be selected by a corresponding user. For example, a plurality of types of information regarding the appearances such as the face part ID, the hair part ID, and the clothes part ID, and the like of each avatar are prepared. With respect to the face part ID, a part ID may be prepared for each of face parts including a shape of the face, the eyes, the mouth, and the nose, and information regarding the face part ID may be managed as a combination of the IDs of the parts of the face, instead. In this case, not only the server apparatus 10 but the terminal apparatus 20 can draw each avatar on the basis of a corresponding ID relating to the appearances associated with a corresponding avatar ID.

The user input obtaining unit 150 obtains various user inputs from each user made through the input unit 24 of the terminal apparatus 20. The various inputs are as described above and may include tracking information obtained through motion capture.

If the certain trigger condition is satisfied, the avatar processing unit 152 triggers an automatic reaction of an avatar. The automatic reactions are as described above.

The avatar processing unit 152 includes an avatar motion processing section 1521 and a drawing section 1522.

The avatar motion processing section 1521 determines a motion of each avatar (positional changes, movement of each part, etc.) on the basis of various inputs from a corresponding user.

The drawing section 1522 generates images of a virtual space including avatars and images (terminal images) to be displayed on the terminal apparatus 20. The drawing section 1522 generates images (images for the terminal apparatus 20) for each avatar on the basis of values (a position, a gazing direction, an angle of view, etc.) of imaging parameters of a virtual camera associated with the avatar. The values of the imaging parameters of the virtual camera associated with each avatar may basically (except when the field of view processing unit 160 intervenes, which will be described later) correspond to values (e.g., positions of the eyes, the gazing direction, eyesight, etc.) of various parameters relating to a field of view of the avatar. In the present embodiment, the drawing section 1522 draws an avatar at a time when an automatic reaction is triggered. The drawing section 1522 can draw an avatar that triggers an automatic reaction with a reduced processing load on the basis of the automatic reaction-related data in the automatic reaction-related data storage unit 142 illustrated in FIG. 11.

The association unit 153 associates, with each avatar, text information relating to a corresponding user's or the avatar's tastes and personality (hereinafter represented as "tastes"). In the present embodiment, the association unit 153 associates, with each avatar, text information regarding a corresponding user's or the avatar's tastes by generating or updating the user information in the user information storage unit 144.

For example, the association unit 153 may associate, with each avatar, text information specified by a corresponding user. Alternatively, the association unit 153 may associate, with each avatar, text information corresponding to various pieces of information relating to a corresponding user's or the avatar's tastes on the basis of the various pieces of information. In the example illustrated in FIG. 12, various pieces of information relating to a corresponding user's or an avatar's tastes include the profile information, the friend information, and the taste information. The conversion/speech information, the activity information, and the item information can represent a corresponding avatar's tastes. Various pieces of information relating to a corresponding user's or an avatar's tastes may include at least the conversion/speech information, the activity information, or the item information.

Text information associated by the association unit 153 in this manner may be manually corrected, namely edited, for example, by a corresponding user.

The interaction limiting unit 154 determines, for each avatar, another avatar (another avatar that can be a companion avatar) available for interaction with the avatar on the basis of text information associated with the avatar. For example, the interaction limiting unit 154 may determine another avatar available for interaction with an avatar on the basis of at least profile information associated with the avatar, conversation/speech information regarding the avatar, the item information associated with the avatar, or an action history of the avatar in a virtual space.

When an action history is used, for example, an avatar that tends to give specific negative emotes and unfavorable gifts, an avatar that tends to annoy other avatars, or an avatar that has been cautioned, warned, or reported more than a certain number of times by the other avatars or third avatars for violating rules or manners in reactions thereof to specific actions may be determined as an avatar unavailable for interaction with the other avatars. When an action history is used, a range of other avatars available for interaction may be expanded for users with high billing on the basis of consumption of in-service currency (billing status) and other factors.

In this case, the interaction limiting unit 154 may determine, on the basis of text information associated with an avatar, an avatar with which text information that satisfies one of the above-described certain trigger conditions relating to automatic reactions is associated as another avatar available for interaction.

The interaction limiting unit 154 may determine, on the basis of friend information, an avatar for which a follower of another avatar has set the mute flag or the block black as an avatar unavailable for interaction. That is, flag limiting information regarding an avatar may copy flag limiting information associated with a follower of the avatar.

After determining other avatars available for interaction with an avatar in this manner, the interaction limiting unit 154 generates or updates limiting flag information regarding the avatar in the user information in the user information storage unit 144. The limiting flag information associated with the avatar may be changed as necessary on the basis of user inputs from a user corresponding to the avatar.

The trigger condition determination unit 155 determines whether one of the above-described certain trigger conditions is satisfied for each combination of avatars.

In the present embodiment, the trigger condition determination unit 155 includes a determination target determination section 1550, a first determination section 1551, a second determination section 1552, and a third determination section 1553.

The determination target determination section 1550 determines an avatar for which the determination based on one of the certain trigger conditions is to be made.

The determination target determination section 1550 includes a first determination target determination portion 15501 and a second determination target determination portion 15502.

The first determination target determination portion 15501 determines, for each avatar, which is a reaction-oriented avatar, other avatars (hereinafter referred to as "first determination target avatars") that can be companion avatars. Reaction-oriented avatars may be limited to avatars that desire to trigger automatic reactions on the basis of the automatic reaction setting information included in the user information in the user information storage unit 144. In this case, a processing load relating to the trigger condition determination unit 155 can be efficiently reduced.

The first determination target determination portion 15501 may limit, for a reaction-oriented avatar, the first determination target avatars on the basis of positional relationships with the reaction-oriented avatar. For example, the first determination target determination portion 15501 may limit other avatars having the first certain positional relationship with a reaction-oriented avatar as the first determination target avatars. In this case, the processing load relating to the trigger condition determination unit 155 can be efficiently reduced.

The first determination target determination portion 15501 may limit, for a reaction-oriented avatar, the first determination target avatars on the basis of limiting flag information regarding the reaction-oriented avatar. More specifically, the first determination target determination portion 15501 may limit the first determination target avatars on the basis of the limiting flag information regarding the reaction-oriented avatar such that the first determination target avatars include only other avatars for which neither the mute flag nor the block flag has been turned on. In this case, the processing load relating to the trigger condition determination unit 155 can be efficiently reduced.

When an avatar performs a specific action, which has been described above, the second determination target determination portion 15502 determines other avatars (hereinafter referred to as "second determination target avatars") that can be reaction-oriented avatars. In this case, too, the reaction-oriented avatars may be limited, on the basis of the automatic reaction setting information included in the user information in the user information storage unit 144, to avatars that desire to trigger automatic reactions. In this case, the processing load relating to the trigger condition determination unit 155 can be efficiently reduced.

The second determination target determination portion 15502 may limit, for an avatar that performs a specific action, the second determination target avatars on the basis of positional relationships with the avatar that performs the specific action. For example, the second determination target determination portion 15502 may limit other avatars having the first certain positional relationship with the avatar that performs the specific action as the second determination target avatars. In this case, the processing load relating to the trigger condition determination unit 155 can be efficiently reduced.

The second determination target determination portion 15502 may limit, for an avatar that performs a specific action, the second determination target avatars on the basis of limiting flag information regarding the avatar that performs the specific action. More specifically, the second determination target determination portion 15502 may limit the second determination target avatars on the basis of the limiting flag information relating to the avatar that performs the specific action such that the second determination target avatars include only avatars for which neither the mute flag nor the block flag has been turned on. In this case, the processing load relating to the trigger condition determination unit 155 can be efficiently reduced.

When an avatar is a reaction-oriented avatar, the first determination section 1551 determines, for each of the first determination target avatars determined by the first determination target determination portion 15501, whether the first certain trigger condition is satisfied. The first certain trigger condition is as described above with reference to FIGS. 4 and 5.

When an avatar has performed a specific action, which has been described above, the second determination section 1552 determines, for each of the second determination target avatars determined by the second determination target determination portion 15502, whether the second certain trigger condition is satisfied. The second certain trigger condition is as described above with reference to FIGS. 6 and 7.

The third determination section 1553 determines whether a reaction-oriented avatar and a companion avatar have the first certain positional relationship. The first certain positional relationship is as described above. For example, the third determination section 1553 may make the determination on the basis of at least one of parameters including a distance between the reaction-oriented avatar and the companion avatar, presence or absence of an obstacle (another object) between the avatars, presence or absence of the reaction-oriented avatar within the companion avatar's field of view, and whether a state where the reaction-oriented avatar is located outside the companion avatar's field of view can be changed to a state where the reaction-oriented avatar is located inside the companion avatar's field of view. When an obstacle is taken into consideration, whether the reaction-oriented avatar is located inside the companion avatar's field of view may be determined. The change from the state where the reaction-oriented avatar is located outside the companion avatar's field of view to the state where the reaction-oriented avatar is located inside the companion avatar's field of view may include a change that can be achieved by the field of view processing unit 160, which will be described later.

The reaction type determination unit 156 selects, when a reaction-oriented avatar triggers an automatic reaction, which has been described above, a type of automatic reaction from a plurality of selectable types. In the present embodiment, a plurality of types of automatic reaction are prepared. That is, as described above with reference to FIG. 11, the same trigger condition information is associated with a plurality of automatic reaction IDs.

Any rules may be employed for the selection performed by the reaction type determination unit 156, and, for example, random rules may be employed. The reaction type determination unit 156, however, may select, on the basis of text information that has satisfied the first certain trigger condition, a type of automatic reaction that suits the text information. If the text information that has satisfied the first certain trigger condition includes "band", for example, a type of automatic reaction indicating music or a band may be selected. Similarly, the reaction type determination unit 156 may select, on the basis of text information that has satisfied the second certain trigger condition or an attribute of a specific action at the time, a type of automatic reaction that suits the text information and/or the specific action.

The parameter calculation unit 158 calculates various parameters that can be used to determine whether a certain trigger condition is satisfied. The various parameters may include parameters relating to text information.

In the present embodiment, the parameter calculation unit 158 includes a first calculation section 1581 and a second calculation section 1582.

The first calculation section 1581 calculates an inter-word distance between text information associated with a reaction-oriented avatar and text information associated with a first determination target avatar. A method for calculating the inter-word distance may be as described above. Because text information fundamentally tends to include a short word, a processing load for calculating an inter-word distance can be efficiently reduced.

The second calculation section 1582 calculates an inter-word distance between a word relating to a specific action and text information associated with a second determination target avatar. A method for calculating the inter-word distance may be as described above. Because text information fundamentally includes a short word, a processing load for calculating an inter-word distance can be efficiently reduced.

The word relating to the specific action may be put into a word in advance in accordance with an attribute of the specific action. In this case, a word relating to a specific action may be stored for each specific action ID. With this configuration, a process for calculating a word relating to a specific action is unnecessary, which reduces the processing load.

The field of view processing unit 160 performs a process for temporarily changing the values (the position, the gazing direction, the angle of view, etc.) of the imaging parameters of a virtual camera associated with a specific avatar regardless of a user input from a user.

In the present embodiment, the field of view processing unit 160 includes a first field of view changing section 1601 and a second field of view changing section 1602.

The first field of view changing section 1601 changes, when a reaction-oriented avatar triggers an automatic reaction for a companion avatar, the values of the imaging parameters of a virtual camera associated with the companion avatar such that the reaction-oriented avatar is located inside the companion avatar's field of view. As a result, as described above, the companion avatar will notice the reaction-oriented avatar more easily, thereby efficiently facilitating interaction between the avatars.

The second field of view changing section 1602 temporarily changes, when an avatar and another avatar enter a second certain positional relationship, a field of view of one of the two avatars such that the other avatar is located inside the field of view. The second certain positional relationship may be the same as the first certain positional relationship or include a positional relationship where two avatars are located farther from each other than in the first certain positional relationship. When a new avatar has entered a chatroom, for example, the new avatar tends to be located inside fields of view of other avatars in the chatroom by temporarily changing fields of view of a subset or all of the avatars in the chatroom. As a result, interaction between the avatars can be facilitated. Although an avatar to be focused upon, for example, is made stand out by temporarily changing avatars' fields of view in the present embodiment, the avatar to be focused upon may be highlighted or a guide indicating a position of the avatar to be focused upon (a position of an avatar outside a field of view) may be displayed instead of, or in addition to, the temporal change. The guide may be given by vibrating a controller, such as a joypad, in a user's hands or through sound instead of, or in addition to, the displayed guide.

The user information disclosure control unit 162 makes part (hereinafter referred to as "disclosed user information") of the user information in the user information storage unit 144 available to other avatars (users) for viewing. The disclosed user information may include profile information and text information. For example, the profile information may be made available for viewing in accordance with a certain user input (hereinafter referred to as a "disclosure request"). In this case, the user information disclosure control unit 162 may make disclosed user information regarding an avatar for which the mute flag has been turned on unavailable to a user who has turned on the mute flag for the avatar. The user information disclosure control unit 162 may make disclosed user information regarding a user who has turned on the block flag for an avatar unavailable for viewing to the avatar for which the block flag has been turned on.

A disclosure request may be generated in any mode. When a terminal apparatus 20 such as a smartphone is used, for example, a disclosure request for disclosed user information regarding an avatar (a disclosure request from another avatar) may be generated by tapping the avatar on a screen. Alternatively, a disclosure request may be generated by holding a magnifying glass on the avatar. In a metaverse space, a disclosure request for disclosed user information regarding an avatar (a disclosure request from another avatar) may be generated by gazing the avatar for a certain period of time or longer. Alternatively, a disclosure request may be generated by matching lines of sight with the avatar (i.e., meeting the eyes).

How the functions are assigned to the server apparatus 10 and the terminal apparatus 20 in the above description is just an example, and may be changed in many ways as described above. That is, a subset or all of the functions of the server apparatus 10 may be achieved by the terminal apparatus 20 as necessary, instead.

Next, an example of an operation performed by the virtual reality generation system 1 in relation to an automatic reaction of an avatar, which has been described above, will be described with reference to FIGS. 15 and 16.

Figure 15:
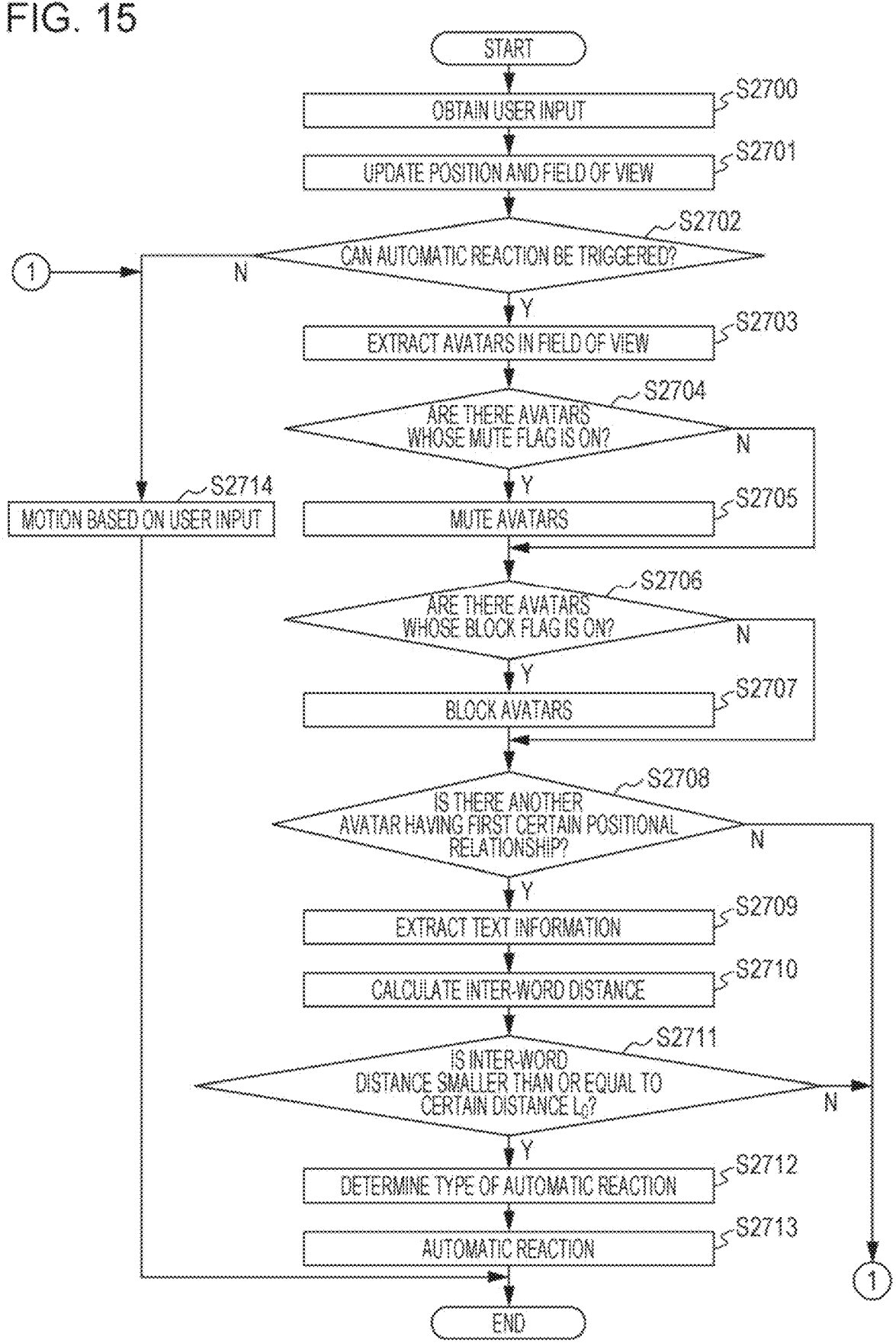
FIG. 15 is a schematic flowchart illustrating an example of a process performed by the server apparatus in relation to an automatic reaction of an avatar.

FIG. 15 is a schematic flowchart illustrating an example of a process performed by the server apparatus 10 in relation to an automatic reaction of an avatar, which has been described above. The process illustrated in FIG. 15 relates to a specific avatar (hereinafter referred to as a "process target avatar") and may be repeatedly performed in certain cycles. The process illustrated in FIG. 15 may be performed in parallel for different avatars in a virtual space.

In step S2700, the server apparatus 10 obtains a user input in a current cycle from a user corresponding to the process target avatar.

In step S2701, the server apparatus 10 updates a position and a field of view (virtual camera) of the process target avatar on the basis of the user input obtained in step S2700.

In step S2702, the server apparatus 10 determines, on the basis of the automatic reaction setting information, whether a setting state has been established where an automatic reaction can be triggered. The automatic reaction setting information is as described above in relation to the user information in the user information storage unit 144. If a result of the determination is "YES", the process proceeds to step S2703, and in other cases, the process proceeds to step S2714.

In step S2703, the server apparatus 10 extracts one or more other avatars located inside the field of view of the process target avatar. Although not illustrated, if there are no other avatars, the process in the current cycle may end.

In step S2704, the server apparatus 10 determines, on the basis of the limiting flag information (refer to FIG. 12) associated with the process target avatar, whether there are, among the one or more other avatars extracted in step S2703, avatars for which the mute flag has been turned on. In a modification, avatars for which the mute flag has been turned on may be excluded in advance as a process target. If a result of the determination is "YES", the process proceeds to step S2705, and in other cases, the process proceeds to step S2706.

In step S2705, the server apparatus 10 excludes the avatars for which the mute flag has been turned on as a processing target in step S2706 and later steps and mutes the avatars. As described above, in the muting of avatars, the avatars become essentially nonexistent to the process target avatar.

In step S2706, the server apparatus 10 determines, on the basis of the limiting flag information (refer to FIG. 12) associated with the process target avatar, whether there are, among the one or more other avatars extracted in step S2703, avatars for which the block flag has been turned on. If a result of the determination is "YES", the process proceeds to step S2707, and in other cases, the process proceeds to step S2708.

In step S2707, the server apparatus 10 excludes the avatars for which the block flag has been turned on as a processing target in step S2708 and later steps and blocks the avatars as an interaction target. As described above, in the blocking of avatars, the process target avatar becomes unable to approach or talk to the avatars.

In step S2708, the server apparatus 10 determines whether there is another avatar having the first certain positional relationship with the process target avatar. If a result of the determination is "YES", the process proceeds to step S2709, and in other cases, the process proceeds to step S2714.

In step S2709, the server apparatus 10 extracts text information associated with the other avatar having the first certain positional relationship with the process target avatar. If there are a plurality of other avatars having the first certain positional relationship with the process target avatar, the processing in steps S2709 to S2713 may be sequentially performed for each of the other avatars.

In step S2710, the server apparatus 10 calculates an inter-word distance on the basis of text information associated with the process target avatar and the text information extracted in step S2709. A method for calculating the inter-word distance is as described above.

In step S2711, the server apparatus 10 determines whether the inter-word distance is smaller than or equal to a certain distance $L_0$. The certain distance $L_0$ may be a fixed value or a variable value. For example, the user may set the certain distance $L_0$. If a result of the determination is "YES", the server apparatus 10 may determine that the first certain trigger condition is satisfied, and the process proceeds to step S2712, and in other cases, the process proceeds to step S2714.

In step S2712, the server apparatus 10 determines a type of automatic reaction. The server apparatus 10 may determine the type of automatic reaction on the basis of the text information whose inter-word distance has been determined in step S2711 to be smaller than or equal to the certain distance $L_0$. If the text information whose inter-word distance has been determined to be smaller than or equal to the certain distance $L_0$ includes "alcohol" in common, for example, the type of automatic reaction may be a motion relating to a drinking gesture. If the text information whose inter-word distance has been determined to be smaller than or equal to the certain distance $L_0$ includes "basketball (sports)" in common, the type of automatic reaction may be a motion relating to a shooting gesture. In a modification, the strength of a motion relating to the automatic reaction may be changed in accordance with the inter-word distance. If the type of automatic reaction is waving of a hand, for example, the type of automatic reaction may be determined such that the waving of the hand becomes more vigorous as the inter-word distance becomes smaller.

In step S2713, the server apparatus 10 triggers the type of automatic reaction determined in step S2712 for the process target avatar. As described above, although the present disclosure aims to effectively facilitate interaction between avatars, types of automatic reaction are limited because tracking of automatic reactions of the process target avatar for all of specific actions by other avatars can excessively increase a processing load and it might be difficult to react in a timely manner in important scenes (e.g., first meetings) if the process target avatar is slow to react or it takes time to transmit motion data due to communication conditions.

In step S2714, the server apparatus 10 causes the process target avatar to perform a motion according to the user input.

Figure 16:
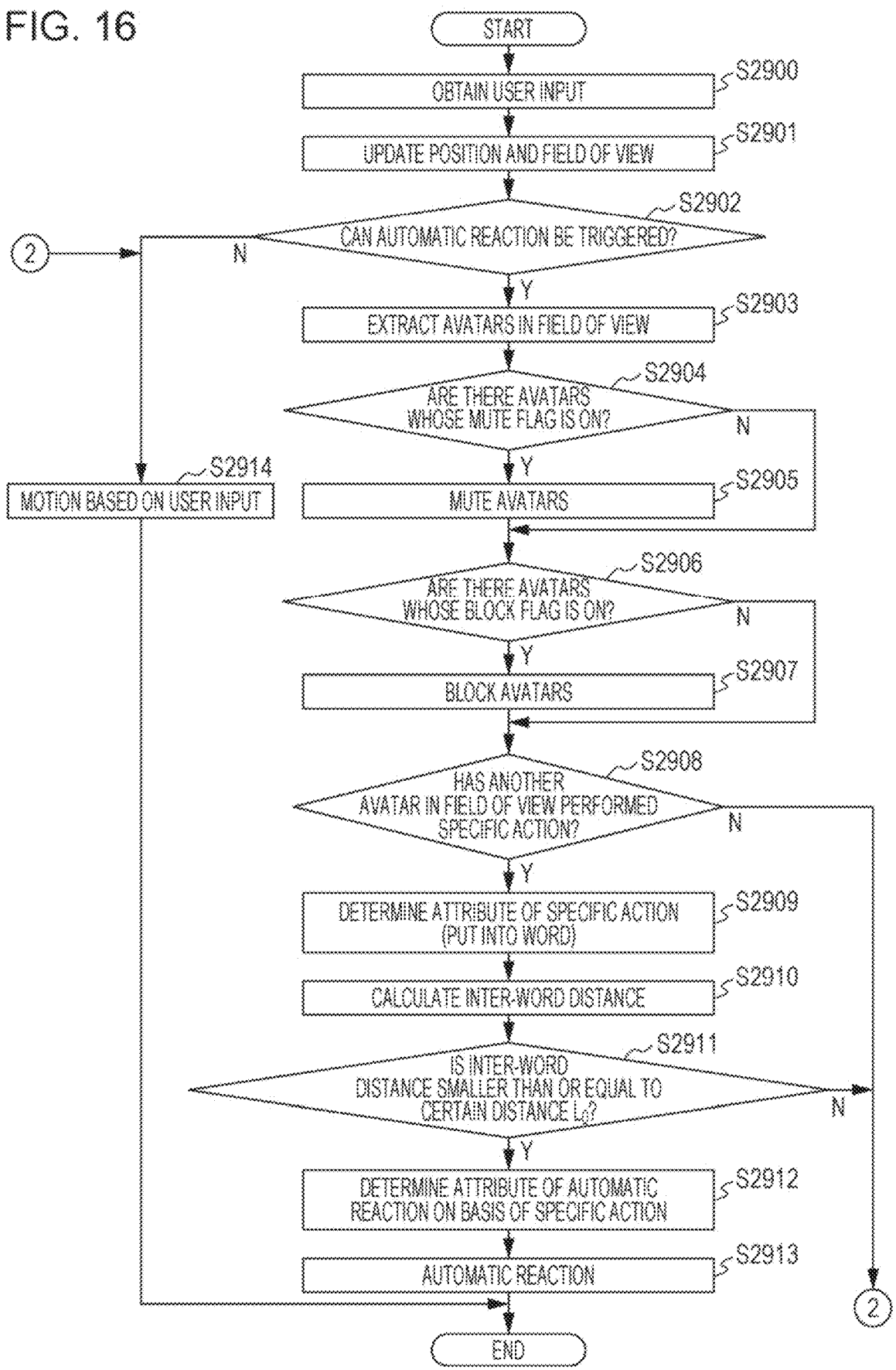
FIG. 16 is a schematic flowchart illustrating another example of the process performed by the server apparatus in relation to an automatic reaction of an avatar.

FIG. 16 is a schematic flowchart illustrating another example of the process performed by the server apparatus 10 in relation to an automatic reaction of an avatar, which has been described above. As with the process illustrated in FIG. 15, the process illustrated in FIG. 16 relates to a specific avatar (hereinafter referred to as a "process target avatar") and may be repeatedly performed in certain cycles. The process illustrated in FIG. 16 may be performed in parallel for different avatars in a virtual space. The process illustrated in FIG. 16 may be performed in parallel with the process illustrated in FIG. 15.

Processing in steps S2900 to S2907 may be the same as that in steps S2700 to S2707 illustrated in FIG. 15, and description thereof is omitted.

In step S2908, the server apparatus 10 determines whether another avatar inside a field of view of the process target avatar has performed (is performing) the specific action. The specific action is as described above. If a result of the determination is "YES", the process proceeds to step S2909, and in other cases, the process proceeds to step S2914. In the determination, the automatic reaction may be triggered even for a specific action performed by another avatar outside the field of view of the process target avatar at a certain time point, if the specific action can be located inside the field of view of the process target avatar once the field of view changes.

In step S2909, the server apparatus 10 identifies an attribute of the specific action and determines (obtains) a word according to the attribute. When the specific action is "soccer ball juggling", for example, the word according to the attribute of the specific action may be "soccer" and/or "juggling". When a soccer ball has a distinctive design, a word according to the design may be determined. If there are a plurality of other avatars that have performed the specific action inside the field of view of the process target avatar, the processing in steps S2909 to S2913 may be sequentially performed for each of the other avatars.

In step S2910, the server apparatus 10 calculates an inter-word distance on the basis of text information associated with the process target avatar and the text information extracted in step S2909. A method for calculating the inter-word distance as described above.

In step S2911, the server apparatus 10 determines whether the inter-word distance is smaller than or equal to the certain distance $L_0$. The certain distance $L_0$ may be a fixed value or a variable value. For example, the user may set the certain distance $L_0$. If a result of the determination is "YES", the server apparatus 10 determines that the first certain trigger condition is satisfied, and the process proceeds to step S2912, and in other cases, the process proceeds to step S2914.

In step S2912, the server apparatus 10 determines a type (attribute) of automatic reaction. The server apparatus 10 may determine the type of automatic reaction on the basis of the text information (the word according to the attribute of the specific action) whose inter-word distance has been determined in step S2911 to be smaller than or equal to the certain distance $L_0$. Step S2912 is the same as step S2712 described with reference to FIG. 15.

In step S2913, the server apparatus 10 triggers the type of automatic reaction determined in step S2912 for the process target avatar.

In step S2914, the server apparatus 10 causes the process target avatar to perform a motion according to the user input.

Although an embodiment has been described above, the present disclosure is not limited to this specific embodiment, and may be modified or altered in various ways within the scope described in the claims. Some or all of the elements described in the above embodiment may also be combined together.

What is claimed is:

1. An information processing system, comprising:
processing circuitry configured to
process motion of each avatar of plural avatars in a virtual space;
associate, with an avatar of the plural avatars, text information specified by a user corresponding to the avatar or text information relating to the avatar;
determine a relationship between text information associated with a first avatar and text information associated with a second avatar; and
in a case that the first avatar and the second avatar have a first positional relationship in the virtual space, control the second avatar or both the first avatar and the second avatar to automatically perform a certain motion based on a result of the determined relationship.

2. The information processing system according to claim 1, wherein in a case that the processing circuitry determines that the text information associated with the first avatar and the text information associated with the second avatar have a certain relationship, the processing circuitry controls the second avatar or both the first avatar and the second avatar to automatically perform the certain motion.

3. The information processing system according to claim 2, wherein
the certain relationship includes a relationship including a common point, and
the certain motion includes motions of the first avatar and the second avatar performed for each other.

4. The information processing system according to claim 2, wherein the processing circuitry is further configured to
calculate an inter-word distance between the text information associated with the first avatar and the text information associated with the second avatar, and
determine a presence or absence of the certain relationship based on the inter-word distance.

5. The information processing system according to claim 1, wherein in a case that the first avatar and the second avatar have the first positional relationship and the first avatar performs a specific action, the processing circuitry controls the second avatar to automatically perform the certain motion based on an attribute of the specific action and the text information associated with the second avatar.

6. The information processing system according to claim 5, wherein the processing circuitry is further configured to
determine a first relationship between the attribute of the specific action and the text information associated with the second avatar, and
control the second avatar to automatically perform the certain motion based on a result of the determination of the first relationship.

7. The information processing system according to claim 6, wherein in a case that the processing circuitry determines that the attribute of the specific action and the text information associated with the second avatar have a certain relationship, the processing circuitry controls the second avatar to automatically perform the certain motion.

8. The information processing system according to claim 7, wherein the certain relationship includes a relationship including a common point, and
the certain motion includes a favorable reaction of the second avatar to the specific action.

9. The information processing system according to claim 7, wherein the processing circuitry determines, among a plurality of types of certain motion, a type of certain motion to be automatically performed based on at least the attribute of the specific action or the text information having the certain relationship with the attribute of the specific action.

10. The information processing system according to claim 1 wherein the processing circuitry determines, among a plurality of types of certain motion, a type of certain motion to be automatically performed based on at least the text information associated with the first avatar or the text information associated with the second avatar.

11. The information processing system according to claim 1, wherein the processing circuitry is further configured to generate and update the text information associated with the avatar based on at least profile information associated with the avatar or an update mode of the profile information.

12. The information processing system according to claim 1, wherein the processing circuitry is further configured to generate and update the text information associated with the avatar based on conversation information or speech information regarding the avatar.

13. The information processing system according to claim 1, wherein the processing circuitry is further configured to generate and update the text information associated with the avatar based on an action history of the avatar in the virtual space.

14. The information processing system according to claim 1, wherein the processing circuitry is further configured to determine, based on at least profile information associated with an avatar, conversation information regarding the avatar, item information associated with the avatar, or an action history of the avatar in the virtual space, another avatar available for interaction with the avatar.

15. The information processing system according to claim 1, wherein in a case that several avatars are associated with a user, the processing circuitry associates the text information for each of the plurality of avatars.

16. The information processing system according to claim 1, wherein in a case that the second avatar automatically performs the certain motion for the first avatar, the processing circuitry changes a field of view of the first avatar such that the second avatar is located inside the field of view of the first avatar.

17. The information processing system according to claim 1, wherein in a case that the first avatar and the second avatar have entered a second certain positional relationship in the virtual space, the processing circuitry changes a field of view of one of the first and second avatars such that another of the first and second avatars is located inside the field of view of the one of the first and second avatars.

18. The information processing system according to claim 1, wherein the processing circuitry is further configured to
determine whether the first avatar and the second avatar have the first certain positional relationship in the virtual space, and
determine whether the first and second avatars have the first certain positional relationship based on at least one of parameters including a distance between the first and second avatars, a presence or absence of an obstacle between the first and second avatars, a presence or absence of the second avatar inside a field of view of the first avatar, and whether a state where the second avatar is located outside the field of view of the first avatar is changeable to a state where the second avatar is located inside the field of view of the first avatar.

19. A non-transitory computer-readable storage medium storing computer-executable instructions which, when executed by one or a plurality of processors of an information processing system, cause the one or plurality of processors to perform a process comprising:

processing motion of each avatar of plural avatars in a virtual space;

associating, with an avatar of the plural, text information specified by a user corresponding to the avatar or text information relating to the avatar;

determining a relationship between text information associated with a first avatar and text information associated with a second avatar; and controlling, in a case that the first avatar and the second avatar have a certain positional relationship in the virtual space, the second avatar or both the first avatar and the second avatar to automatically perform a certain motion based on a result of the determining.

20. A method for processing information performed by a computer, the method comprising:

processing motion of each avatar of plural avatars in a virtual space;

associating, with an avatar of the plural avatars, text information specified by a user corresponding to the avatar or text information relating to the avatar;

determining a relationship between text information associated with a first avatar and text information associated with a second avatar; and controlling, in a case that the first avatar and the second avatar have a certain positional relationship in the virtual space, the second avatar or both the first avatar and the second avatar to automatically perform a certain motion based on a result of the determining.

* * * * *